United States Patent
Swenson et al.

(10) Patent No.: US 10,647,492 B2
(45) Date of Patent: *May 12, 2020

(54) PLASTIC CONTAINER WITH FLEXIBLE BASE PORTION

(71) Applicant: MILACRON LLC, Cincinnati, OH (US)

(72) Inventors: Paul M. Swenson, Concord, MA (US); Douglas G. Sabin, Marblehead, MA (US); Adrienne Murphy Jalbert, Waltham, MA (US)

(73) Assignee: MILACRON LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,752

(22) Filed: Jun. 29, 2018

(65) Prior Publication Data

US 2018/0305105 A1     Oct. 25, 2018

Related U.S. Application Data

(63) Continuation of application No. 15/308,829, filed as application No. PCT/US2015/029659 on May 7, 2015, now Pat. No. 10,017,314.

(Continued)

(51) Int. Cl.
*B65D 79/00*     (2006.01)
*B65D 1/12*     (2006.01)
(Continued)

(52) U.S. Cl.
CPC .......... *B65D 79/005* (2013.01); *B29C 45/164* (2013.01); *B29C 45/20* (2013.01);
(Continued)

(58) Field of Classification Search
CPC . B65D 1/12; B65D 1/165; B65D 1/16; B65D 1/14; B65D 1/46; B65D 1/40;
(Continued)

(56) References Cited

U.S. PATENT DOCUMENTS

| 2,982,440 A | 5/1961 | Harrison |
| 3,160,302 A | 12/1964 | Chaplin |
| 3,409,167 A | 11/1968 | Lewis |
| 3,524,568 A | 8/1970 | Nughes |
| 4,125,632 A | 11/1978 | Vosti et al. |

(Continued)

FOREIGN PATENT DOCUMENTS

| FR | 1 558 212 | 2/1969 |
| FR | 1558212 A | 2/1969 |

(Continued)

OTHER PUBLICATIONS

International Search Report and Written Opinion dated Jul. 21, 2015 in corresponding International Patent Application No. PCT/US2015/029659.

*Primary Examiner* — Robert J Hicks
(74) *Attorney, Agent, or Firm* — Medler Ferro Woodhouse & Mills PLLC

(57) ABSTRACT

Plastic container (110), including a side wall (120) and a flexible portion (132) of a base (130). The flexible portion of the base deflects when the sealed plastic container experiences a differential pressure. The deflection of the flexible portion of the base acts to change the internal volume of the container and thereby reduce the differential pressure. The container is a retortable container. The container may be injection-molded with inner and outer plastic layers (460, 462) and a core layer (464) between the inner and outer plastic layers.

20 Claims, 34 Drawing Sheets

Related U.S. Application Data

(60) Provisional application No. 61/990,048, filed on May 7, 2014.

(51) Int. Cl.
*B29C 45/16* (2006.01)
*B29C 45/20* (2006.01)
*B29C 45/26* (2006.01)
*B65D 1/16* (2006.01)
*B29K 23/00* (2006.01)
*B29L 31/00* (2006.01)

(52) U.S. Cl.
CPC ............... *B29C 45/26* (2013.01); *B65D 1/12* (2013.01); *B65D 1/165* (2013.01); *B29K 2023/065* (2013.01); *B29K 2023/086* (2013.01); *B29K 2023/12* (2013.01); *B29K 2995/0046* (2013.01); *B29L 2031/717* (2013.01)

(58) Field of Classification Search
CPC ........ B65D 25/14; B65D 79/005; B65D 7/44; B65D 7/42; B65D 11/20; B65D 11/22; B29C 45/164; B29C 45/20; B29C 45/26
USPC ....... 220/657, 656, 624, 623, 610, 609, 608, 220/604, 62.22, 62.11
See application file for complete search history.

(56) References Cited

U.S. PATENT DOCUMENTS

| | | |
|---|---|---|
| 4,381,061 A | 4/1983 | Cerny et al. |
| 4,501,781 A | 2/1985 | Kushida et al. |
| 4,642,968 A | 2/1987 | McHenry et al. |
| 4,743,479 A | 5/1988 | Nakamura et al. |
| 4,880,129 A | 11/1989 | McHenry et al. |
| 5,234,126 A | 8/1993 | Jonas et al. |
| 5,269,437 A | 12/1993 | Gygax |
| 6,632,493 B1 | 10/2003 | Hildebrand et al. |
| 6,942,116 B2 | 9/2005 | Lisch et al. |
| 8,701,887 B2 | 4/2014 | Baker et al. |
| 10,017,314 B2 * | 7/2018 | Swenson ................. B65D 1/12 |
| 2003/0047565 A1 | 3/2003 | Oda et al. |
| 2004/0263315 A1 | 12/2004 | Kim et al. |
| 2006/0006133 A1 | 1/2006 | Lisch et al. |
| 2006/0113274 A1 | 6/2006 | Keller et al. |
| 2011/0056947 A1 * | 3/2011 | White ..................... B65D 1/10 220/289 |
| 2012/0015122 A1 | 1/2012 | Swenson |
| 2012/0091149 A1 | 4/2012 | Pedmo |
| 2012/0325828 A1 | 12/2012 | Houlton et al. |
| 2013/0043209 A1 | 2/2013 | Wurster et al. |

FOREIGN PATENT DOCUMENTS

| | | |
|---|---|---|
| JP | H06-278164 | 10/1994 |
| JP | H06278164 A | 10/1994 |
| WO | 01/19683 | 3/2001 |
| WO | 2001/019683 A1 | 3/2001 |

* cited by examiner

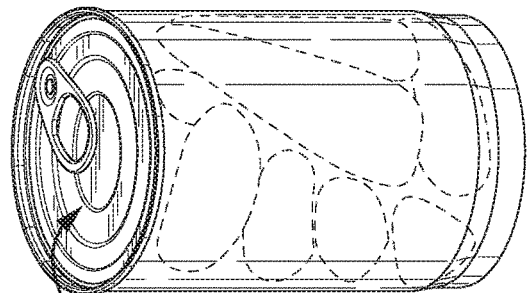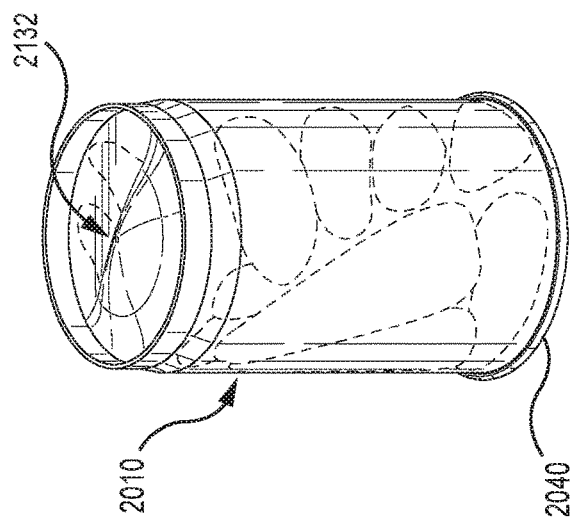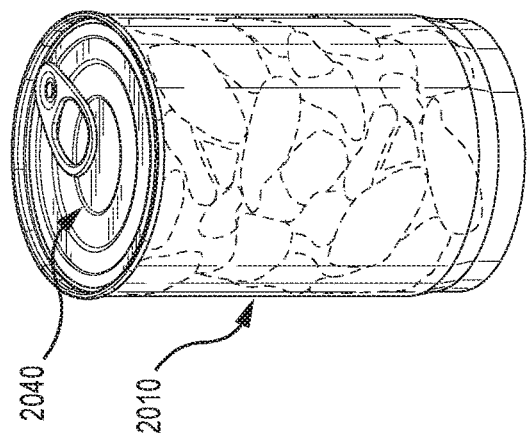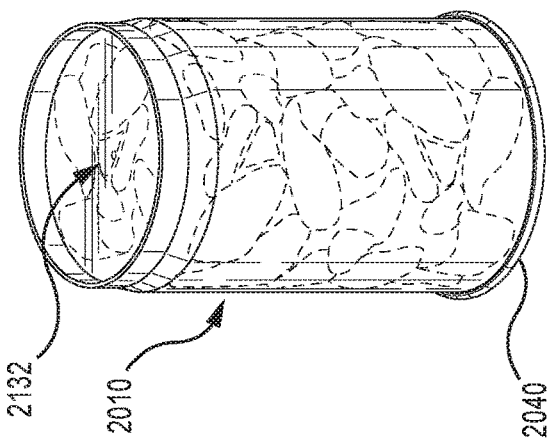
FIG. 20  FIG. 21
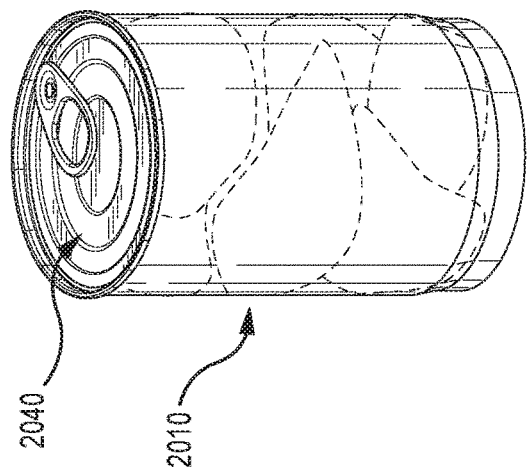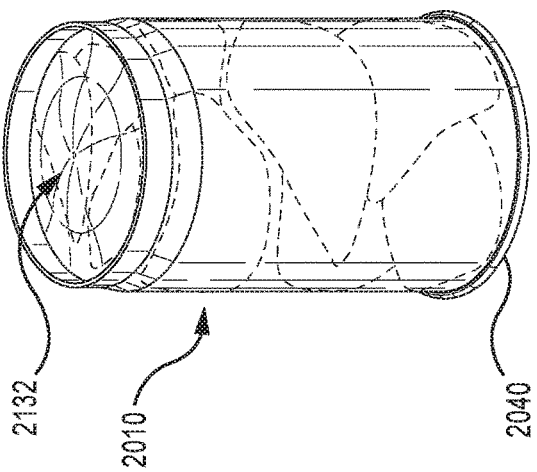

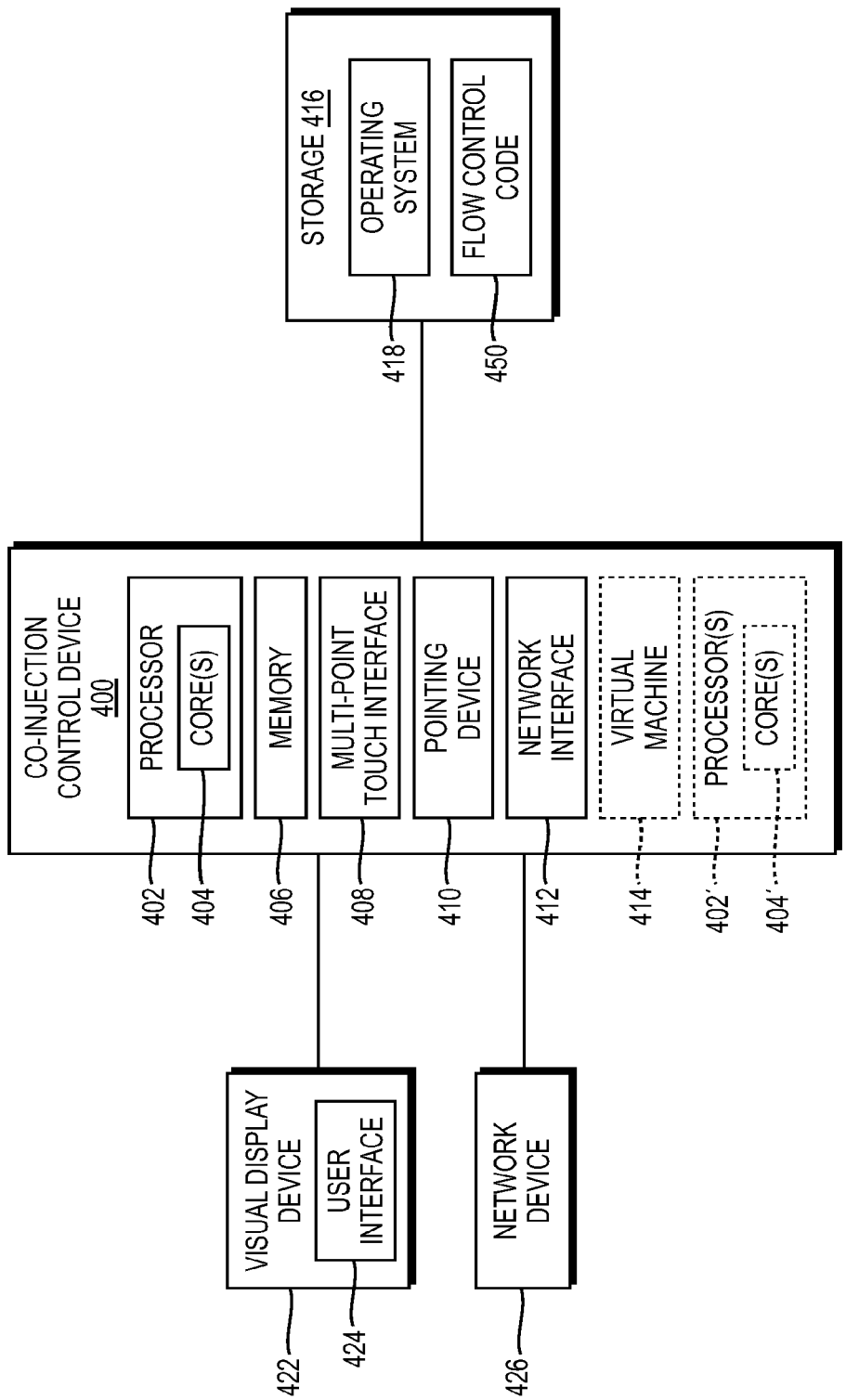

PLASTIC CONTAINER WITH FLEXIBLE BASE PORTION

RELATED APPLICATION

This application is a continuation of prior U.S. application Ser. No. 15/308,829, filed in the U.S. on Nov. 3, 2016, which is a national stage application of PCT/US2015/029659, filed May 7, 2015, which claims priority to and the benefit of U.S. Appl. No. 61/990,048, filed May 7, 2014, the entire contents of which are incorporated by reference herein in their entirety.

FIELD

Example embodiments are directed to plastic containers used to hold food, beverages, pharmaceuticals and nutraceuticals. In particular, example embodiments relate to molded plastic containers having flexible base configurations for retort processing.

BACKGROUND

Containers used to hold food, beverages, pharmaceuticals, nutraceuticals, etc. may undergo a retort sterilization process. In such a process, a container is filled with product (e.g., food) at an elevated temperature and then sealed. After sealing, the container is further heated to sterilize the contents of the container during the retort process. Changes in temperatures and pressure during the retort process cause the container to experience a variety of positive and negative differential pressures during the process. For example, heating of the sealed container increases the internal pressure of the container. During the retort process, the pressure within the container can reach levels in excess of 30 psig. Following sterilization the container cools and the internal pressure of the container decreases and may dip to below an ambient pressure external to the container. Containers often subjected to a retort process include, for example, metal containers, such as double seamed metal cans. Metal cans are designed to withstand the significant positive and negative gradient pressures that may be experienced during a retort process. For example, side walls of metal cans may include ridges encircling the can, known as beads, which aid in the prevention of deformation or paneling when the can experiences a negative differential pressure. Also, the metal cans are designed to withstand high pressures without bulging. The mechanical properties of the metal used for a metal double seamed can are not significantly affected by the temperature increase employed during a retort process.

In comparison to the material of a metal double seam can, polymers used to make polymer containers are much less strong than materials used to make a metal double seam can (e.g., stainless steel), specifically, they have lower elastic modulus and are softer. Also, the mechanical properties of polymers used to make a polymer container are greatly affected by the temperature increase that would be employed during a retort process. For example, the tensile modulus of polypropylene (PP) changes by a factor of about ten between 20° C. and 130° C.

For polymer containers, the high temperature of the retort process and accompanying pressures may cause undesirable creep deformation of the container. Further, the negative differential pressure during various portions of the retort process may also cause geometrical deformation of the container shape. Such deformations may be described as bulging of the container or paneling of the container.

SUMMARY

Embodiments described herein include, but are not limited to, plastic containers each including a base with a flexible portion (e.g., for use with retort processing), molds for making plastic containers, methods for forming plastic containers, and methods for retort processing of plastic containers.

Some embodiments include a retortable plastic container that can withstand a retort process without readily apparent or unwanted plastic deformation or geometric deformation. The retort process may be a saturated steam retort process, a water immersion retort process (static or rotary), a water spray retort process (static or rotary), a steam-air retort process (static or rotary), or any combination of the aforementioned. The retort process may be performed with an overpressure in the retort chamber or without an overpressure in the retort chamber.

An embodiment includes a plastic container with a side wall defining an open end of the container and a base opposite the open end having a flexible portion. The flexible portion of the base has an initial configuration. The container with the base in an initial configuration encloses an initial volume when sealed. The flexible portion of the base may deflect from the initial configuration to a displaced configuration resulting in a change in internal volume of the container when sealed. The deflection of the flexible portion of the base may be in response to changes in differential pressure and may fully or at least partially accommodate the changes in differential pressure. As used herein, differential pressure refers to a difference between pressure inside a sealed container and pressure external to the sealed container. The flexible portion is designed to flex and maintain an internal pressure that prevents the side wall of the container from bulging or paneling. More specifically, the flexible base may be configured to have a range of deflection that enables the enclosed volume of the container to adjust to keep the differential pressure between the outside of the container and the inside of the container below the differential pressure that would cause the side wall of the container to collapse inward or panel. In some embodiments, the deflection of the flexible portion acts to reduce the positive differential pressure, the negative differential pressure, or both, experienced by the plastic container during retort processing.

In some embodiments, the flexible portion is configured to deflect in response to a pressure differential to change an internal volume of the container, when sealed, by at least 3% without deformation of the side wall of the container. In some embodiments, the flexible portion is configured to deflect in response to a pressure differential to change an internal volume of the container, when sealed, by at least 4% without deformation of the side wall of the container. In some embodiments, the flexible portion is configured to deflect in response to a pressure differential to change an internal volume of the container, when sealed, by at least 5% without deformation of the side wall of the container.

In some embodiments, the flexible portion of the base has a dome shaped central region that is connected to the side wall by a peripheral region of the flexible portion with a change in curvature from positive or convex curvature in the central region to negative or concave curvature in the peripheral region, where positive or convex curvature of the shape of the central region corresponds to the central region being bowed outward away from an open end of the container when flexible portion of the base is in an undeflected "as formed" state. This change in curvature, which can occur at an inflexion point or an inflection line, creates a flexible portion of the base that can accommodate a large useful volume range. The change in curvature enables the dome to deflect through the needed range of deflections at lower differential pressures as compared to a flexible portion whose curvature is uniformly positive or uniformly negative. Further the change in curvature across the flexible portion of the base enables the shape of the central region of the dome to change from positive curvature to zero curvature or negative curvature as needed in response to relatively low differential pressures in the container to accommodate pressure changes and keep the differential pressure below a level that would result in unwanted container deformation. The geometric parameters of the container may be selected such that the pressure required to deflect the dome is below the pressure that causes the side wall of the container to panel while creating a useful volume range that is large enough to accommodate the desired retort parameters.

In some embodiments, the base of the container includes a skirt portion that extends around the outside of the flexible portion of the base. The skirt portion allows the container to sit on a flat surface without rocking or appearing asymmetric. After retort, the flexible dome should not be able to lift the container off of the ground plane and make the container unstable. The height of the skirt portion can be selected to allow for a flexible portion of the base which permits a suitably large useful volume without having an unstable container after the retort process.

BRIEF DESCRIPTION OF THE DRAWINGS

The drawings are intended to illustrate the teachings taught herein and are not intended to show relative sizes and dimensions, or to limit the scope of examples or embodiments. In the drawings, the same numbers are used throughout the drawings to reference like features and components of like function.

FIGS. 20 and 21 are perspective images of sealed example containers including product (i.e., peaches, dog food and carrots) after a retort process.

FIG. 36 schematically depicts an exemplary computing environment suitable for practicing some exemplary embodiments taught herein.

DETAILED DESCRIPTION

During a retort process, a container is filled with product (e.g., food, beverages, pharmaceuticals, nutraceuticals, etc.), which may be at an elevated temperature (e.g., 80° C.) and sealed, often at an elevated temperature (e.g., 80° C.), and then the container is further heated (e.g., often to between 105° C. and 130° C.) within a retort chamber for sterilization. During filling and retorting of containers, both positive and negative differential pressures are observed. The pressure differentials are created by changes in temperature inside and outside of the sealed container as well as changes in pressure of the retort chamber. Generally speaking, heating of the sealed container increases the internal pressure of the sealed container. A higher pressure within the sealed container as compared to a pressure external to the sealed container is also referred to as a positive pressure differential. During the retort process positive pressure differential, can reach levels in excess of 30 psig. Once heated, the container is cooled, and the internal pressure of the container decreases and may dip below an ambient pressure external to the container. A lower internal pressure within the sealed container as compared to the pressure external to the sealed container is also referred to as a negative pressure differential herein.

As noted in the background section, some conventional plastic containers experience deformation (e.g., creep deformation or geometric deformation) due to the high internal container pressures and high temperatures during the heating portion of the retort process, and/or due to pressure changes inside the container during the cooling portion of the retort process. For example, the side walls of a container may plastically deform by bulging outward or geometrically deform by collapsing inward or paneling during a retort process.

Figure 1:
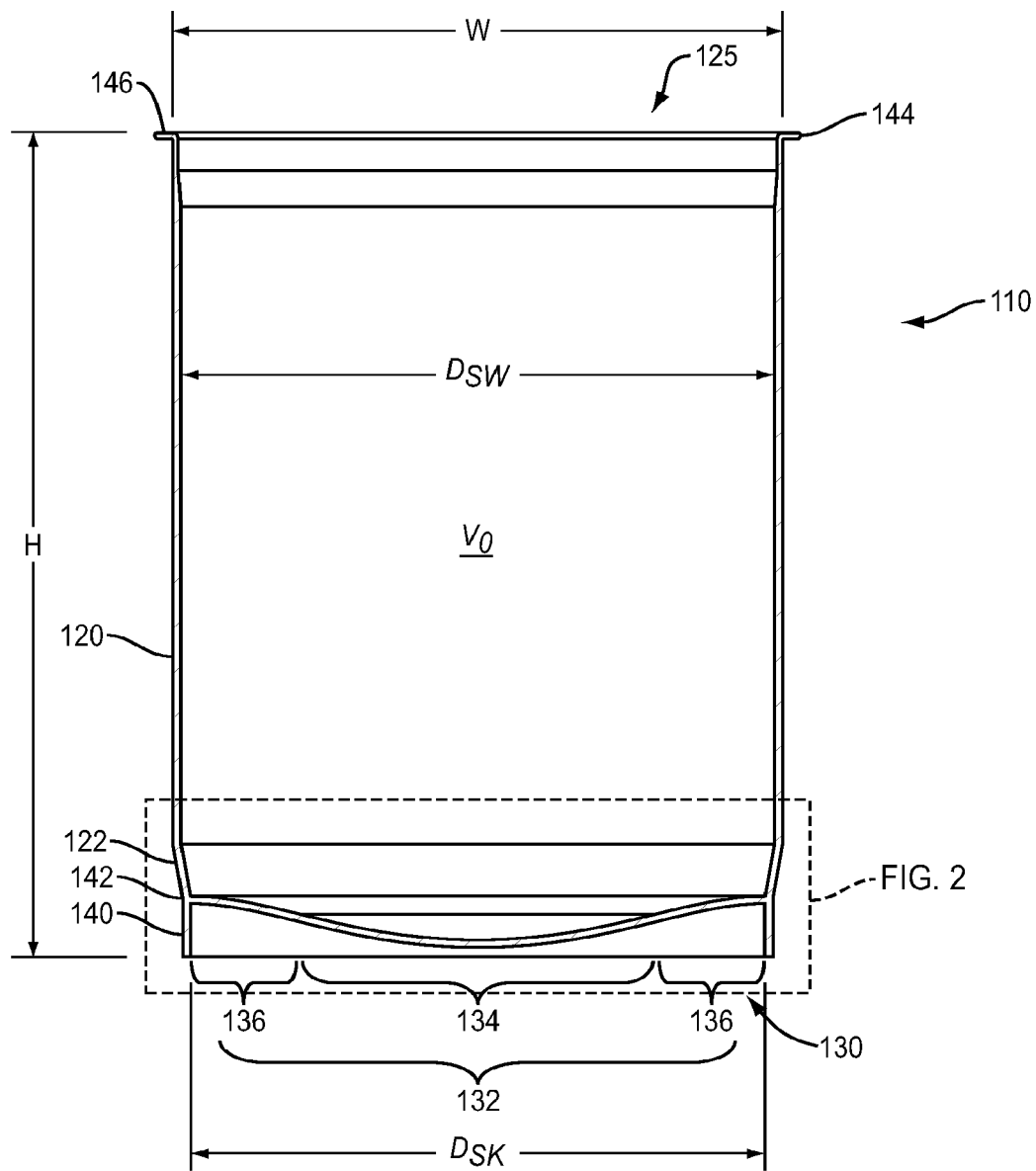
FIG. 1 depicts a side cross-sectional view of a plastic container, in accordance with an embodiment hereof.
Figure 2:
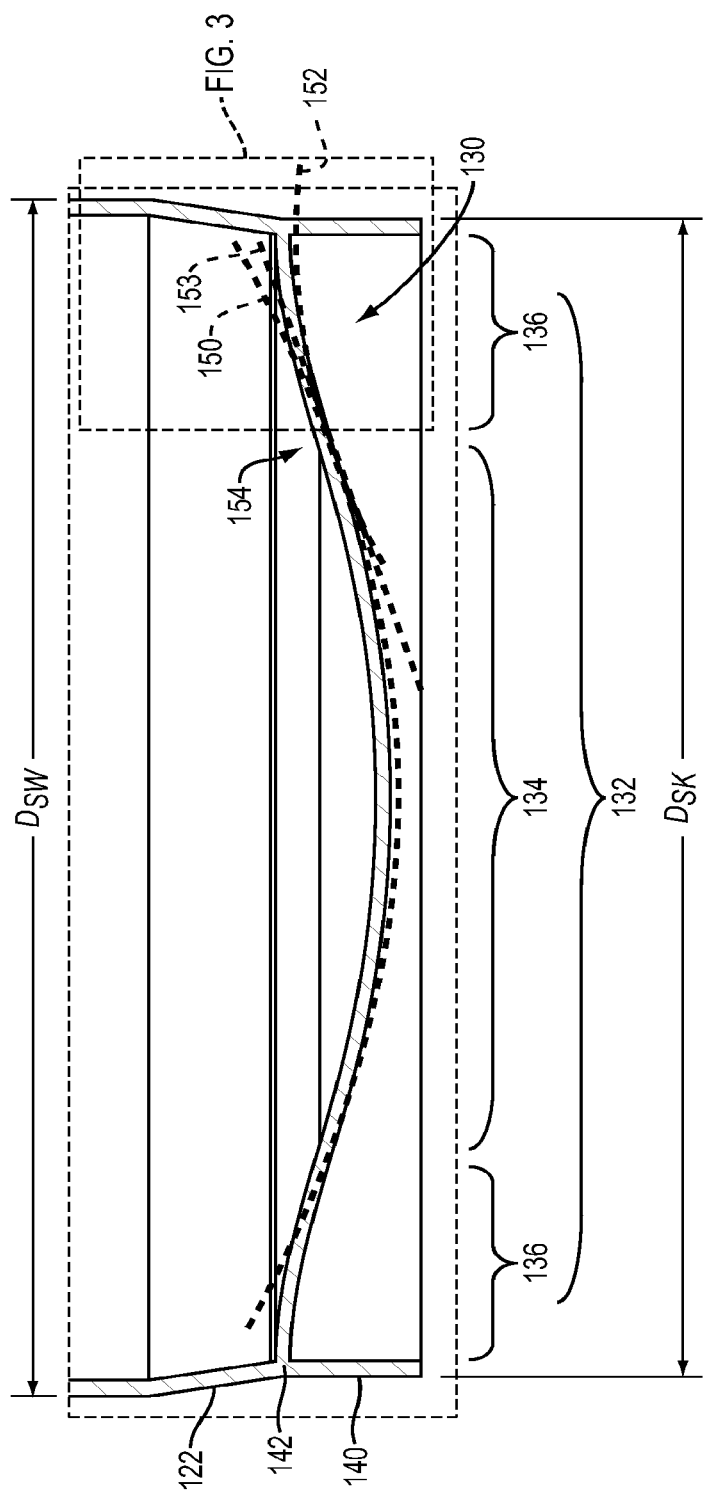
FIG. 2 is an enlarged view of a portion of FIG. 1 which depicts a side cross-sectional view of a base portion of the plastic container of FIG. 1.
Figure 3:
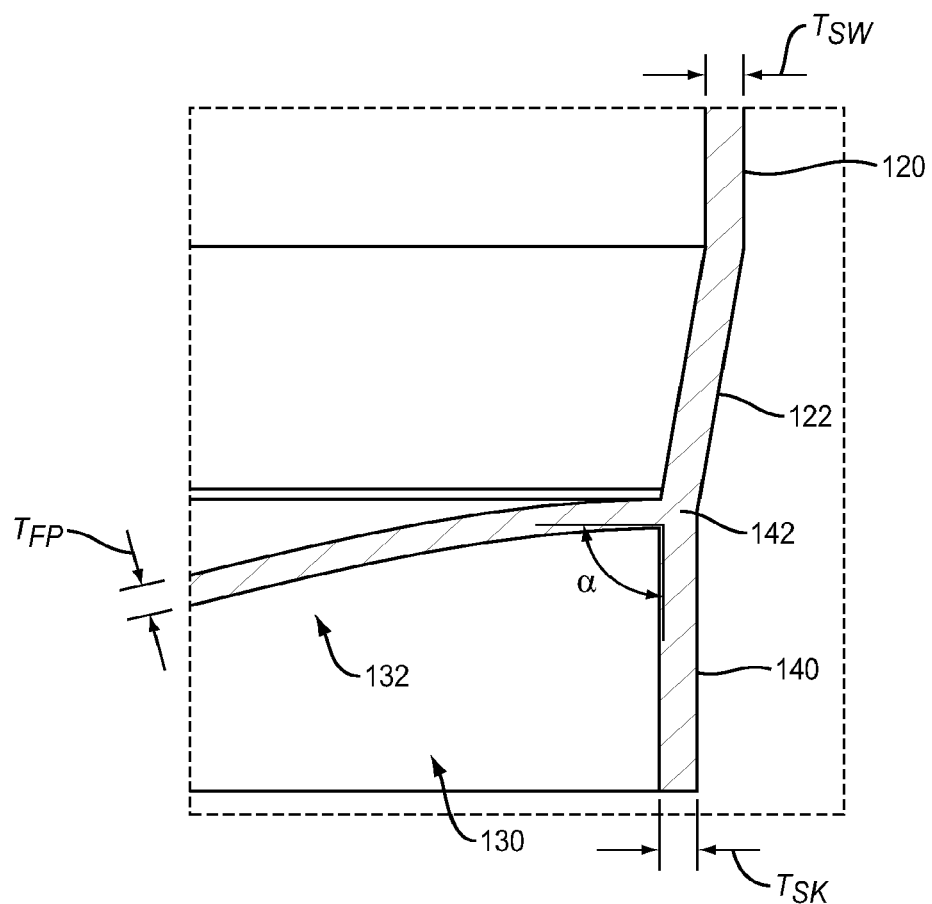
FIG. 3 is an enlarged view of a portion of FIG. 2

Referring now to FIGS. 1, 2, and 3, FIG. 1 is a sectional view of a plastic container 110 in accordance with one or more embodiments hereof that is suitable for use in a retorting process, FIG. 2 is an enlarged view of a portion of FIG. 1, and FIG. 3 is an enlarged view of a portion of FIG. 2. Throughout the figures, cross-sectional thicknesses of the container 110 and various layers of the container may be exaggerated for illustrative purposes. The plastic container 110 includes a side wall 120 defining an open end 125 of the container and a closed end or base 130 opposite the open end. The base 130 includes a flexible portion 132 which defines a bottom panel of the container 110. In some embodiments, the base 130 also includes a skirt portion 140. The flexible portion 132 includes a central region 134 that initially, or when the container 110 is formed, has an "as molded" convex or dome shape extending outwardly, away from the open end 125 of the container 110 before the container 110 is filled or sealed. The flexible portion 132 also includes a peripheral region 136 which joins the flexible portion 132 and the side wall 120. As shown in FIG. 2 the central region 134 is further away from the open end 125 then is the peripheral region 136. The flexible portion 132 is configured to readily snap-back or return to its original as molded shape, if somehow it was mechanically depressed inward, this increases the likelihood that the container reaches the filling line in the as molded configuration.

Some or all of the container 110, the side wall 120, and the base 130 are often made in a manner suitable for high volume production, for example, container 110 may be injection molded, injection-compression molded, thermoformed, or blow molded. However, container 110 may also be formed by other means in some embodiments (e.g., means suited for small volume production).

In some embodiments, the flexible portion 132 joins to the skirt portion 140 of the base and/or to the sidewall 120 at a skirt joint 142. The skirt joint 142 as shown is an intersection of the sidewall 120, the flexible portion 132 of the base, and the skirt portion 140. The angle between flexible portion 132 and skirt portion 140 is selected so as to reduce the movement of the part of flexible portion 132 that is proximate to skirt joint 142 as flexible portion 132 is displaced in response differential pressures. As shown in FIG. 3, the flexible portion 132 joins the skirt portion 140 at an angle α of about 90°; however, in some embodiments, the angle α between flexible portion 132 and skirt portion 140 can be within the range of about 80°-100°. In other words, as shown in the cross sectional view in FIG. 3, a line that is tangent to the flexible portion 132 at skirt joint 142 is substantially perpendicular to the skirt portion 140. However, the intersection of a tangent to the flexible portion 132 and the skirt portion 140 may intersect at an angle falling within a range of intersection angles. For example, peripheral region 136 can be configured such that a line that is tangent to peripheral region 136 at skirt joint 142 intersects with skirt portion at an angle that is within a range of about +/−10° of perpendicular.

In some embodiments, the side wall 120 has a first internal diameter or width $D_{SW}$ at a location that is spaced away from the skirt portion 140, and the diameter or width of the side wall 120 reduces to a smaller skirt internal diameter $D_{SK}$ at a sloped portion 122 of the side wall 120 proximal to the skirt portion 140 (see FIGS. 1 and 2). Such a reduction in diameter at or near the base 130 may aid in stacking one container 110 on top of another container 110 (e.g., if the open end 125 of the container 110 is closed by a double sealed lid). In container 110, the change in diameter occurs entirely in the side wall 110 with the skirt portion 140 having a generally constant diameter. In some embodiments (not shown), the change in diameter may occur partially or entirely in the skirt portion 140. In other embodiments (not shown), the diameter of the skirt portion 140 may be the same as the diameter of the side wall 120 without any reduction in the diameter of the container 110 at the base 130.

Figure 1A:
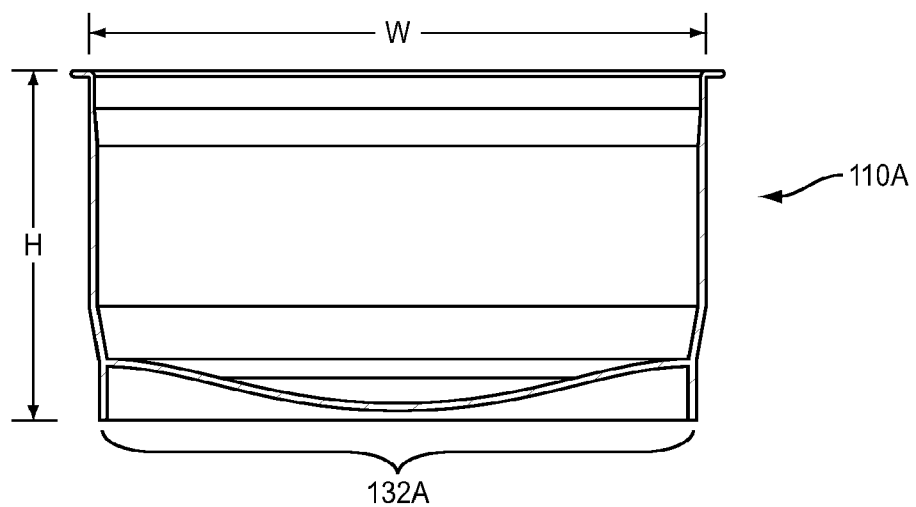
FIG. 1A depicts a side cross-sectional view of a plastic container, in accordance with another embodiment hereof.

As shown in FIG. 1, the container 110 has a generally cylindrical shape; however, it should be appreciated that the container 110 may be formed to have an amount of so-called 'draft' to facilitate removal of container from a mold (not shown), may be formed such that side wall 120 has a generally conical shape, or may be formed with another shape having a generally circular or ovular cross-section taken along a longitudinal axis. As shown in FIG. 1, a height H of the container 110 as measured along the container's longitudinal axis is greater than its width W as measured along an axis transverse to the longitudinal axis. However, in an alternative embodiment, a height H of the container 110A is less than its width W as is shown in FIG. 1A. Such a container may be suitable for packaging tuna or cat food. The volume of container 110A is less than that of container 110. Accordingly, the curvature of flexible portion 132A can be reduced in comparison the curvature of flexible portion 132, as the smaller volume of container 110A means that there is a smaller volume change within container 110A that flexible portion 132A has to accommodate when container 110A is sealed and subjected to a retort process.

In some embodiments, the container 110 includes a flange 144 having a sealing surface 146 configured to engage with a rigid lid. When the container 110 sealed by a closure or lid, see e.g., lid 450 shown in FIG. 4)), the container initially encloses a volume $V_0$. In some embodiments, the flange 144 may be configured to be sealed by a double seam lid. In some embodiments, the flange 144 may be configured to be sealed by a double seam metal lid. As disclosed herein, the closed and sealed container 110 may be described as a plastic can.

Although the containers described herein are configured to be sealed with double seamed metal lids, other types of rigid lids, sealing mechanisms, and/or closure elements may be employed which are also suitable for retort processing.

As depicted in FIG. 2, the central region 134 of the flexible portion 132 has an initial, "as formed" or "as molded", convex or dome shape, and the peripheral region 136 of the flexible portion 132, which may be annular in shape as viewed along the longitudinal axis of the container, has an initial, or "as formed", concave shape. The convex curvature of the shape of the central region 134 extending away from the center of the enclosed volume, as depicted in FIG. 2, is referred to as positive curvature herein. Dotted line 150 is a positive constant curvature line or arc providing a visual guide for the positive curvature of the central region 134. A radius of dotted line 150 extends within the internal volume $V_0$ of the container 110. As depicted in the cross-sectional view of FIG. 2, the peripheral region 136 of the flexible portion 132 has a shape with curvature of a sign opposite that of the curvature of a shape of the central region 134 of the flexible portion 132, accordingly, the curvature of the shape of the peripheral region 136 is referred to as negative curvature herein. Dotted line 152 is a negative constant curvature line or arc providing a visual guide indicating the negative curvature of the peripheral region 136. A radius of dotted line 152 extends external to the internal volume $V_0$ of the container 110. The negative curvature of the peripheral region 136 may be described as the peripheral region 136 having a concave shape. In the embodiment shown, the positive curvature of central region 134 and the negative curvature of peripheral region 136 can be said to follow generally arcuate profiles. As depicted in FIG. 2, the shape of the flexible portion 132 smoothly transitions from positive curvature in the central region 134 to negative curvature in the peripheral region 136 at an inflection boundary line 154. In other words, at the inflection boundary line 154, a tangent 153 to the negative curvature peripheral region 136 overlies a tangent 153 to the positive curvature central region 134. Given the generally circular shape of central region 134, and the generally annular shape of peripheral region 136, boundary line 154 is generally circular. The extent of the central region 134 may be defined by the boundary line 154 between positive curvature and negative curvature. In some embodiments (not shown), the cross-sectional profile of the flexible portion 132 may not be smooth but instead may be made up of a series of planar segments connected to form a generally positive curvature central region 134 and a generally negative curvature peripheral region 136.

The difference in curvature between the central region 134 and the peripheral region 136 of the flexible portion 132 may be used to influence a differential pressure required to deflect the flexible portion 132 when the container 110 is sealed. For example, if there were no peripheral region 136 and the flexible portion 132 had only constant positive spherical curvature, the differential pressure required to deflect the flexible portion would be greater than that for a flexible portion 132 including a central region 134 having positive curvature and a peripheral region 136 having negative curvature.

As shown in FIG. 3, in some embodiments, the flexible portion 132 has a wall thickness $T_{FP}$ that is less than a wall thickness $T_{SW}$ of the container side wall 120. The difference in the wall thickness $T_{FP}$ of the flexible portion 132 compared to the wall thickness $T_{SW}$ of the side wall 120 results in increased flexibility of the flexible portion 132 as compared with that of the side wall 120, thus allowing the flexible portion 132 to deflect under lower differential pressures than would be required to deflect the side wall 120. In some embodiments, the thickness $T_{FP}$ of the flexible portion 132 is within a range of 40% to 100% of the side wall thickness $T_{SW}$. The thickness of the flexible portion 132 in various embodiments depends on the can geometry, fill conditions, and retort conditions. For a common can geometry described in the Examples section below, some example fill conditions, and example retort conditions, an example container had a thickness $T_{FP}$ of the flexible portion 132 that was about 75% of the thickness $T_{SW}$ of sidewall 120.

Also shown in FIG. 3, in some embodiments, the wall thickness $T_{FP}$ of the flexible portion 132 is also smaller than a wall thickness $T_{SK}$ of the skirt portion 140, and the wall thickness $T_{SW}$ of the side wall 120 is about the same as the wall thickness $T_{SK}$ of the skirt portion 140. As shown in FIGS. 1, 2 and 3 the thickness $T_{FP}$ of the flexible portion 132 is constant throughout the central region 134 and peripheral region 136. In other embodiments (not shown) the wall thickness $T_{SK}$ in the skirt portion 140 may be different than the wall thickness $T_{SW}$ of the side wall 120. In some embodiments, the thickness $T_{SK}$ of skirt portion 140 can be selected so at to survive a drop-test.

During retort processing, the flexible portion 132 of the base deflects in response to a pressure differential between the sealed container 110 and the retort chamber. The skirt portion 140 provides a stable container support surface. Without the skirt portion 140, the container 110 would rest on the flexible portion 132, whose shape changes during retort processing and whose final shape after retort depends on the details of retort processing. The skirt portion 140 should be sufficiently tall that, after retort, even under a maximum outward deflection, the flexible portion 132 does not deflect outward beyond the container support surface, which is defined by the bottom of the skirt portion 140. The skirt portion 140 also blocks the view of the flexible portion 132 of the base when the container 110 is resting on a surface, for example, when the container 110 is resting on a shelf in a retail environment.

In some embodiments, the container 110 may include multiple plastic layers (e.g., a plastic inner layer, a plastic outer layer, and a core or interior layer disposed between the plastic inner layer and the plastic outer layer).

For example, a first plastic material may form the inner layer and the outer layer, which together generally conform to the desired end shape of the container, accounting for manufacturing requirements (e.g., expansion/contraction) as is known. The inner layer and the outer layer may be referred to as skin layers or the container skin. Suitable materials for forming the inner and outer layers include those which maintain adequate shape and strength during and following retort processing, and when container is used for packaging food products, are approved for use in food packaging. Examples of materials that may be used for the inner and outer layers include, but are not limited to polypropylene (PP) and high density polyethylene (HDPE). A second material may form the core layer. Suitable materials for the core layer include those that impart characteristics to the container beyond those of the skin layer material alone. The core layer may be, for example, a barrier layer, (e.g., UV or otherwise), a gas scavenging layer, a desiccant layer and/or a filler layer. A suitable gas barrier material for the core layer may be, for example, ethylene vinyl alcohol (EVOH) or other suitable materials, that sufficiently prevent gases, for example, oxygen, from permeating through the container, i.e., from the outside to the inside and vice versa. Though PP, HDPE, and EVOH are suitable materials for forming container 110, it should be understood that other suitable materials may be used depending of the requirements for the container, and that the various embodiments are suitable for use with other polymeric materials.

Figure 4:
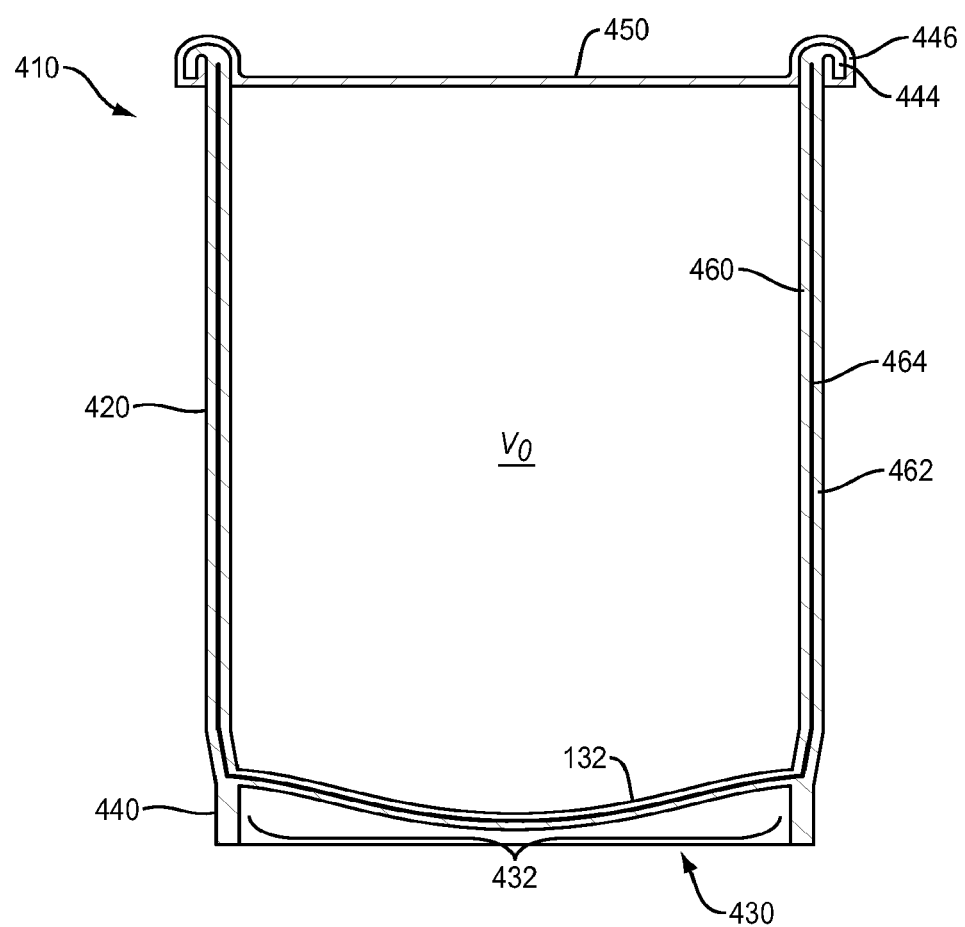
FIG. 4 depicts a cross-sectional view showing an internal multi-layer structure of a plastic container in accordance with an embodiment hereof.

FIG. 4 depicts a cross sectional view showing an internal multi-layer structure of a plastic container 410 in accordance with another embodiment hereof. Features and aspects of the embodiment depicted in FIG. 4 may be used accordingly with the other embodiments. As shown in FIG. 4, container 410 is closed and sealed using a double seam closure, specifically a metal lid 450. The multilayer structure for container 410 includes an inner layer 460 an outer layer 462 and an interior core layer 464. In FIG. 4, the wall thicknesses of the container 410 are exaggerated for illustrative purposes. As depicted in FIG. 4, the core layer 464 may extend substantially throughout the side wall 420 and the flexible portion 432 of the container 410, and may be fully surrounded by the inner layer 460 and the outer layer 462. In some embodiments the core layer 464 may not extend throughout the plastic body of the container 410, but still extend throughout substantially all of the sealable surface area of the container. For example, as shown in FIG. 4, the core layer 464 does not extend into the skirt portion 440, which is used for structural support, and is not considered to be a sealable portion of the container 410 because, unlike side wall 420 and flexible portion 432, skirt portion 440 is not in contact with the sealable volume $V_0$. Further, it may also be cost prohibitive to extend the core layer 464 into the skirt portion 440 as sometimes the core layer material is more expensive than the skin layer material. As used herein, the term "substantially" or "substantially fully" means 95%-100% coverage of the core layer across the sealable surface area defined by container 410. In some embodiments, the core layer 464 may extend beyond the side wall 420 and at least partially into the flange 444 such that the core layer 464 is adjacent to the sealing surface 446 at the open end of the container 410. In other embodiments the core layer 464 may not extend into the flange 444. For example, in FIG. 4, the core layer 464 need not extend fully into the flange 444 of container 410 because the double seam seal of the lid 450 extends beyond the flange 444 to overlap a portion of the side wall 420 in which the core layer 464 is present. Coverage by the interior or core layer 464 is most relevant to the sealable portion of the container 410 that is within the location where the closure 450 is sealed to the container 410. As used herein, the sealable portion of the container 410 refers to portions of the container 410 that enclose or contain the contents of the container 410 and are exposed to the contents of the container 410 when filled, for example, the flexible portion 432 and the side wall 420, and the lid 450, when it is attach to the container 410. The sealable surface area of the container 410 is the surface area of the container that would be exposed to the contents of the container when sealed.

Various techniques known to one of skill in the art may be employed for forming the container 410. For example, the container 410 may be formed by co-injecting a first plastic material such as, e.g., high density polyethylene (HDPE) or polypropylene (PP), and a second plastic material, such as, e.g., ethylene vinyl alcohol (EVOH), into a mold cavity configured to form a molded plastic article.

The container 410 may be created by co-injecting the interior layer or core layer material, which creates the core layer 464, within an inner and outer layer material, which creates the inner and outer layers 160,162. Such methods are generally known, such as described in U.S. Pat. No. 6,908, 581 and the documents incorporated therein, each of which is also incorporated by reference herein in its entirety. U.S. Pat. No. 6,908,581 discloses a method of co-injecting a plurality of plastic material flow streams into a mold cavity to produce a multi-layer molded product. Inner and outer streams of a first material are combined with at least one interior stream of a second material that is to serve as an interior core layer of the second material surrounded by skin layers of the first material in a resulting molded plastic product. The combined streams are forced to flow along flow paths, with the annular interior stream encased within the inner and outer annular plastic material stream layers. During co-injection, the volumetric flow ratio of the inner stream to the outer stream in the combined stream is controlled to position the interior core stream along a flow streamline with a flow velocity that is greater than the average velocity of the combined stream, but less than the maximum flow velocity of the combined stream. By the interior core stream having a velocity greater than the average velocity of the combined stream during co-injection, the leading edge of the interior core stream is often able to catch up with the leading edge of the combined stream preventing or reducing gaps in interior layer coverage at an open end of the container. Because the interior core stream has a velocity less than the average velocity of the combined stream, after the interior core stream catches up with the combined flow front, the interior core stream folds over due to fountain flow effects and does not break through the combined stream flow front.

In some embodiments, during co-injection molding, a flow ratio of the inner stream to the outer stream may be selected to direct the interior core stream through the branch junction at the skirt junction to bypass the skirt portion and enter the sidewall portion. Such methods are described in US Patent Publication No. 2011/0217496, the entire content of which are incorporated herein in their entirety. Further details regarding a suitable injection molding system and methods that may be employed for manufacturing the container 410 are described below with respect to FIGS. 34-36.

Use of Retortable Plastic Containers

As explained above, during the filling and retort process, a sealed container experiences elevated temperature and changes in differential pressure across the sealed container (i.e., between the pressure within the sealed container and the external pressure).

In accordance with embodiments hereof, the flexible portion of the base of the plastic container deflects in response to the changes in differential pressure during the retort process. In general, such deflection acts to change the internal volume of the container to reduce the differential pressure between the interior of the sealed container and the environment external to the container.

In use, a plurality of plastic containers (e.g., plastic container 110, 410) are often filled with hot product and then sealed with a closure, such as a lid (e.g., lid 450 of FIG. 4). In some embodiments, the lid is a double seam lid. In some embodiments, the lid is metal. The initial volume of the filled and sealed container 410 is $V_0$, as shown in FIG. 4. The containers 110, 410 are then placed in a retort chamber. Generally speaking, multiple containers 110, 410 undergo the retort process simultaneously as a batch. For simplicity, the description below refers to a single container 110 in the batch. However, it should be appreciated that other containers 110, 410 in the batch also experience similar pressures and temperature, which may vary across the batch.

Figure 13:
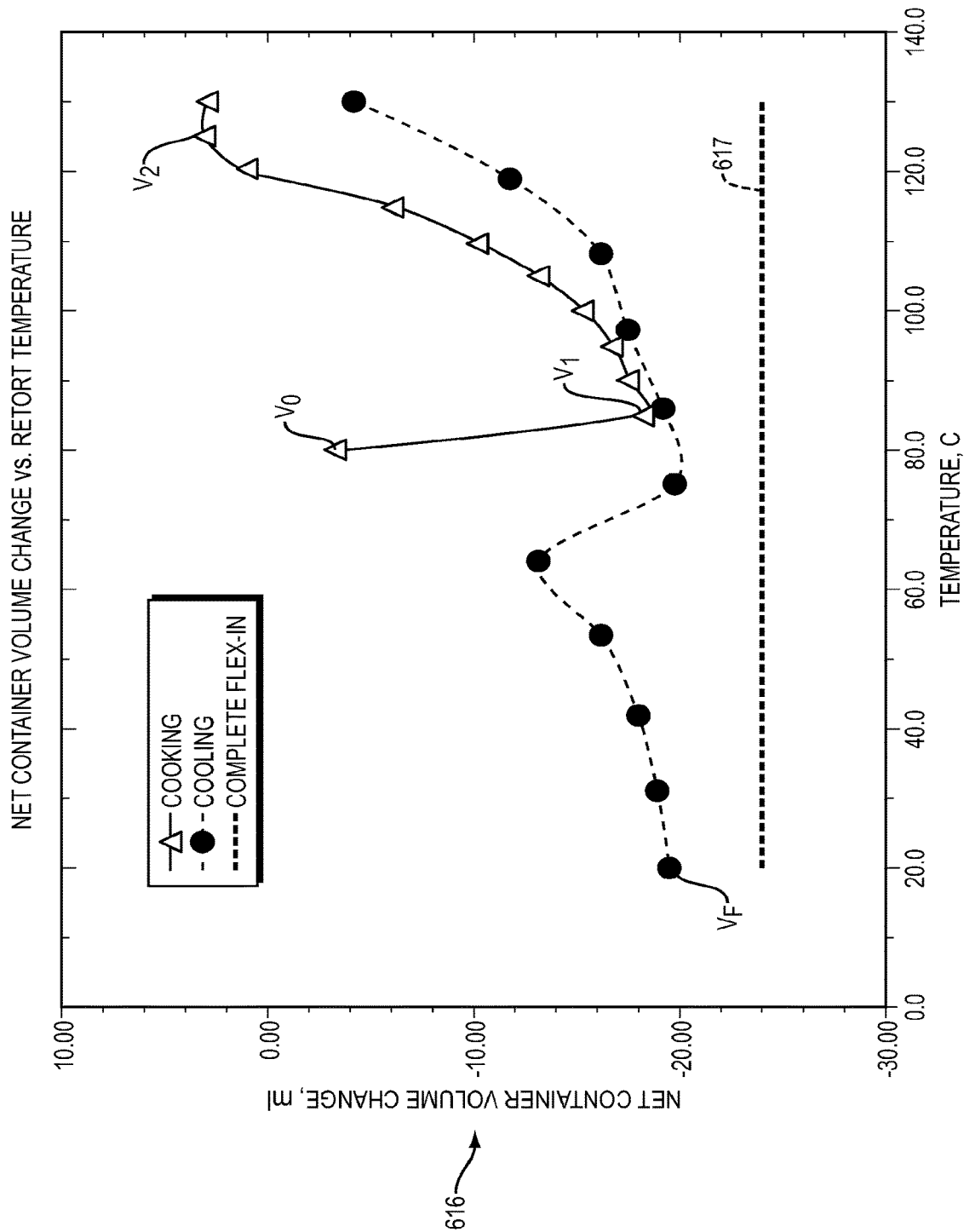
FIG. 13 is a graph of predicted net container volume change as a function of temperature during the retort process for the example container of FIG. 5.

During a retort process, temperature is controlled within the retort chamber. In some retort processes, a pressure within the chamber is increased, which is referred to as retort with chamber overpressure, to reduce the maximum positive pressure differential that the sealed containers 110 within the chamber experience due to increased temperature. In retort processing with chamber overpressure, as the retort chamber initially comes to pressure, a negative differential pressure is created, in which a pressure external to the sealed container 110 is greater than a pressure within the sealed container 110. To compensate for the negative pressure differential the flexible portion 132 of the base 130 deflects inward toward the lid 450 in response to the negative differential pressure reducing the internal container 110 volume to volume $V_1$. As the container 110 and its contents heat up during the retort process, the vapor pressure of the contents increases creating a positive differential pressure, in which a pressure within the sealed container 110 is greater than a pressure external to the sealed container 110, which causes the flexible portion 132 to deflect outwardly, away from the lid 450, increasing the internal volume of the container 110 to volume $V_2$. The outward deflection of the flexible portion 132 acts to reduce the positive differential pressure across the container 110. The container 110 is usually held at an elevated temperature for a period of time, and then the chamber temperature is reduced and the container 110 cools. As the retort process finishes and the container 110 cools, a negative differential pressure is again created which causes the flexible portion 132 to deflect inward, reducing the volume of the container to a final volume $V_F$ when the container 110 reaches room temperature. FIG. 13, which is described below, shows the predicted change in container volume during a retort process and volumes $V_0$, $V_1$, $V_2$, and $V_F$.

The ability to reduce the differential pressure by changing the internal volume of the container 110 is different for negative pressure differentials than for positive pressure differentials. When the container 110 contents are heated, the internal pressure within the container 110 increases as the vapor pressure increases. If the volume inside the container 110 is increased more liquid is easily vaporized to maintain the internal pressure. Alternately, if the container 110 has a negative differential pressure and the internal volume is reduced, the volume of the gaseous head space above the contents is reduced (on a percentage basis) and therefore the internal pressure within the container 110 is increased and the absolute value of the differential pressure reduced.

For containers 110 having the base configuration shown in FIGS. 1 to 4, when the flexible portion 132 deflects, it may not maintain an axially symmetric shape. For example, in some cases, one side or sector of the flexible portion 132 may often experience a greater amount of deflection than another side or sector of the flexible portion 132. If the differential pressure continues to increase enough, the central region 134 may invert from convex out ("flexed out") to concave in ("flexed in"). At the end of the retort process, the flexible portion 132 may be partially inverted, and have an axially asymmetric configuration in which a shape of the flexible portion 132 is asymmetric with respect to rotation about a longitudinal axis of the container 110 (see, for example, the container on the right in the images of example containers after retort processing in FIG. 21).

The initial or "as molded" state of the central region 134 of the flexible portion 132 has a convex shape extending away from the open end 125 of the container 110. The convex shape of the central region 134 increases the enclosed volume of the container 110 for filling as compared with an enclosed volume of a container having a flat shape of the central region of the flexible portion bottom panel, or a container having a bottom panel having an initial shape that is concave inward toward the open end of the container. Throughout retort processing, a differential pressure, between the inside and the outside of the sealed container 110, deflects the flexible portion 132, which changes the internal volume of the sealed container 110. The container 110, and specifically the flexible portion 132 of the base 130, is designed such that, throughout a range of deflections, the differential pressure required to deflect the flexible portion 132 (referred to herein as the deflecting differential pressure) is less than the differential pressure that causes the side wall 120 to bulge or panel. The deflecting differential pressure is a function of both the deflection of the flexible portion 132 and the temperature of the container 110, with the deflecting pressure being lower at higher temperatures. It should be noted that the pressure that could panel a container is lower at retort temperature than at room temperature due to the softening of the polymer; however, the deflecting differential pressure is also lower at retort temperature than at room temperature due to the softening of the polymer which permits easier displacement or deflection of the flexible portion 132 in comparison to the pressure that could panel the container.

With a convex shape of a central region 134 of the flexible portion 132, the maximum deflecting pressure often occurs for small deflections of flexible portion 132 away from its initial configuration when there has been only a small change in the volume of the container 132. Once the concave peripheral region 136 flexible portion 132 begins to significantly deflect inwardly, away from its initial configuration and experiences significant changes in curvature due to a negative differential pressure, the differential pressure that further deflects the flexible portion 132 is reduced. The deflection away from the initial convex configuration reduces the magnitude of the negative differential pressure by reducing the internal volume of the sealed container 110. As noted above, the configuration of the container 110 is designed such that the deflecting differential pressure is less than the differential pressure that may cause paneling. The flexible portion 132 can continue to deflect inward, reducing the internal container volume, until a maximum change in volume is reached. However, if the negative differential pressure is further increased after the maximum change in the internal volume of the container is reached, the flexible portion of the base may not further compensate for the negative differential pressure and the container may be subject to geometric deformation by collapsing or paneling.

The inventors define a useful range of deflection as including the deflections over which the flexible portion 132 of the base 130 deflects and paneling of the side wall does not occur or is not readily observable. The inventors define the volume change associated with the useful range of deflection as the useful volume range. The volume change required for the container 110 or other embodiments of containers described herein is dependent on the contents of the container 110 and the retort process parameters used. It is desirable to have a large useful volume range for a plastic container 110 to accommodate a variety of different retort processing parameters. The larger the useful volume range, the larger the set of retort parameters that can be used without having a detrimentally bulging or paneling container 110 at the end of the retort process. For some common retort processing parameters, accommodation of a 5% change in the volume of the container 110 would be sufficient. For some common retort processing parameters, accommodation of a 4% change in the volume of the container 110 would be sufficient. For some common retort processing parameters, accommodation of a 3% change in the volume of the container 110 would be sufficient. For comparison, a conventional metal can often permits a change in internal volume of the container of 1% during retort processing.

The inventors conducted finite element analysis (FEA) to determine how geometric parameters of the container 110 affect the useful volume range for plastic containers 110 having an initial convex dome shape for a central region 134 of a flexible portion 132 of the base 130 in accordance with embodiments hereof. For this structure geometric parameters that can affect a useful volume range for the container 110 include the diameter of the central region 134, the radius of curvature of the dome-shaped central region 134, the thickness of the flexible portion 132, the thickness of the side wall 120 and the geometry of the peripheral region 136 that joins the dome shaped central region 134 to the container side wall 120. The parameters can be selected to maximize the useful volume range. Because the finite element analysis was conducted on containers 110 having an overall cylindrical shape, some of the description below refers to a model for the container 110 and test containers as "cans."

Figure 5:
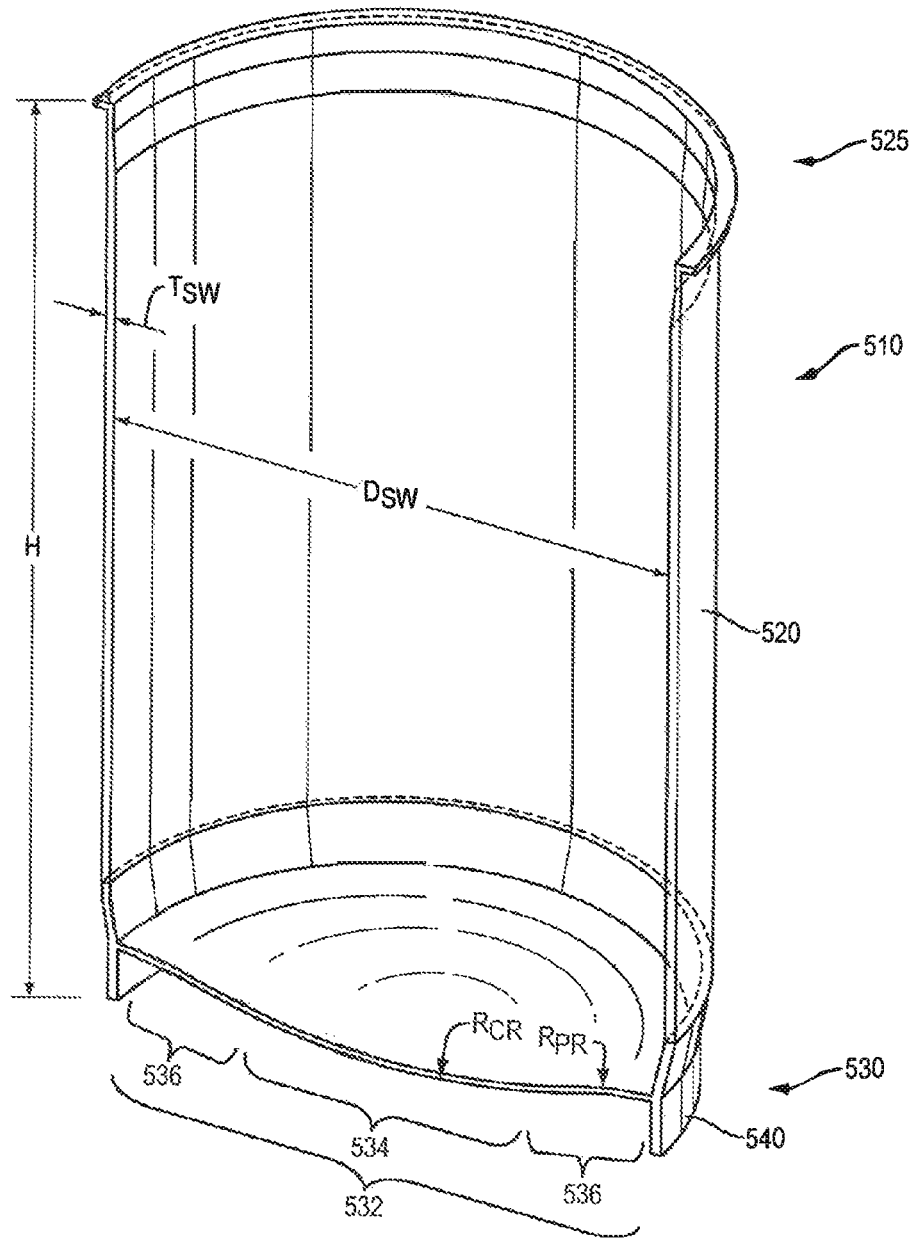
FIG. 5 is a perspective cross-section view of a graphical representation of a container as taught herein used for finite element modeling.
Figure 6:
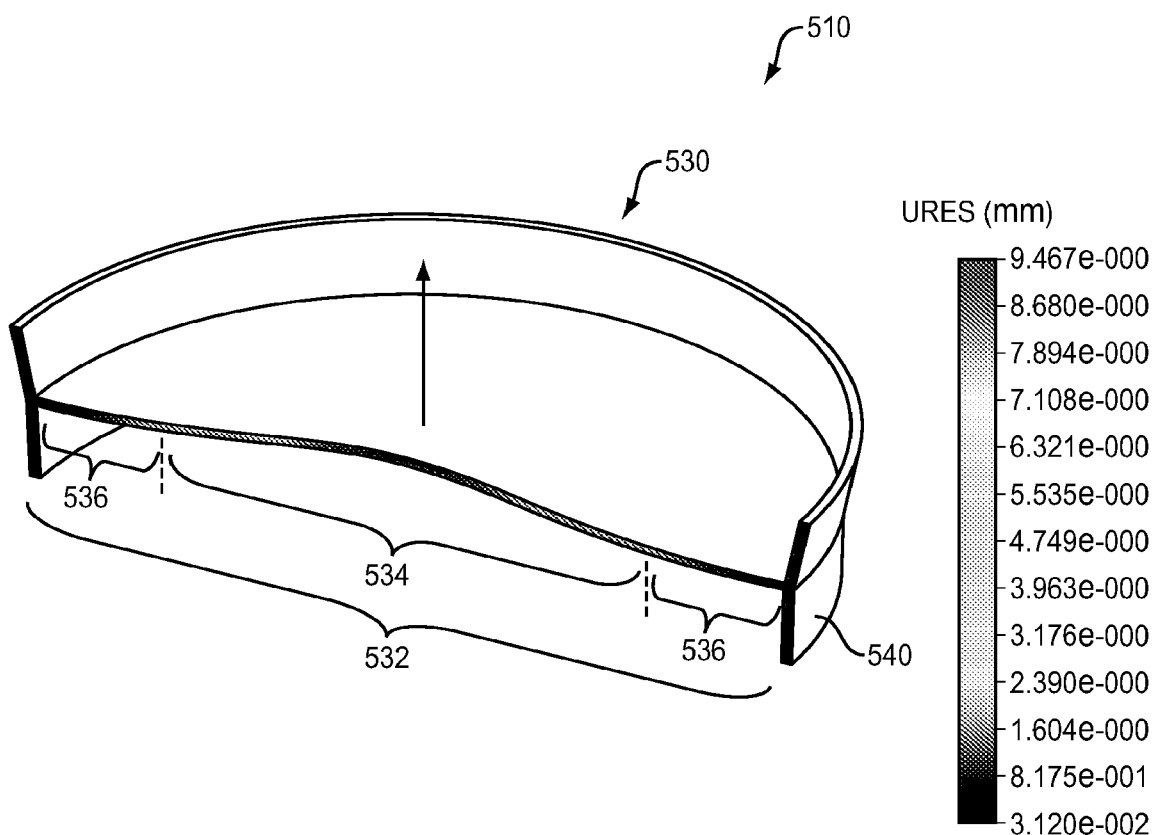
FIG. 6 is a perspective cross-section view of the bottom portion of the model container of FIG. 5 with the flexible portion of the base deflected inward due to a negative pressure differential.
Figure 7:
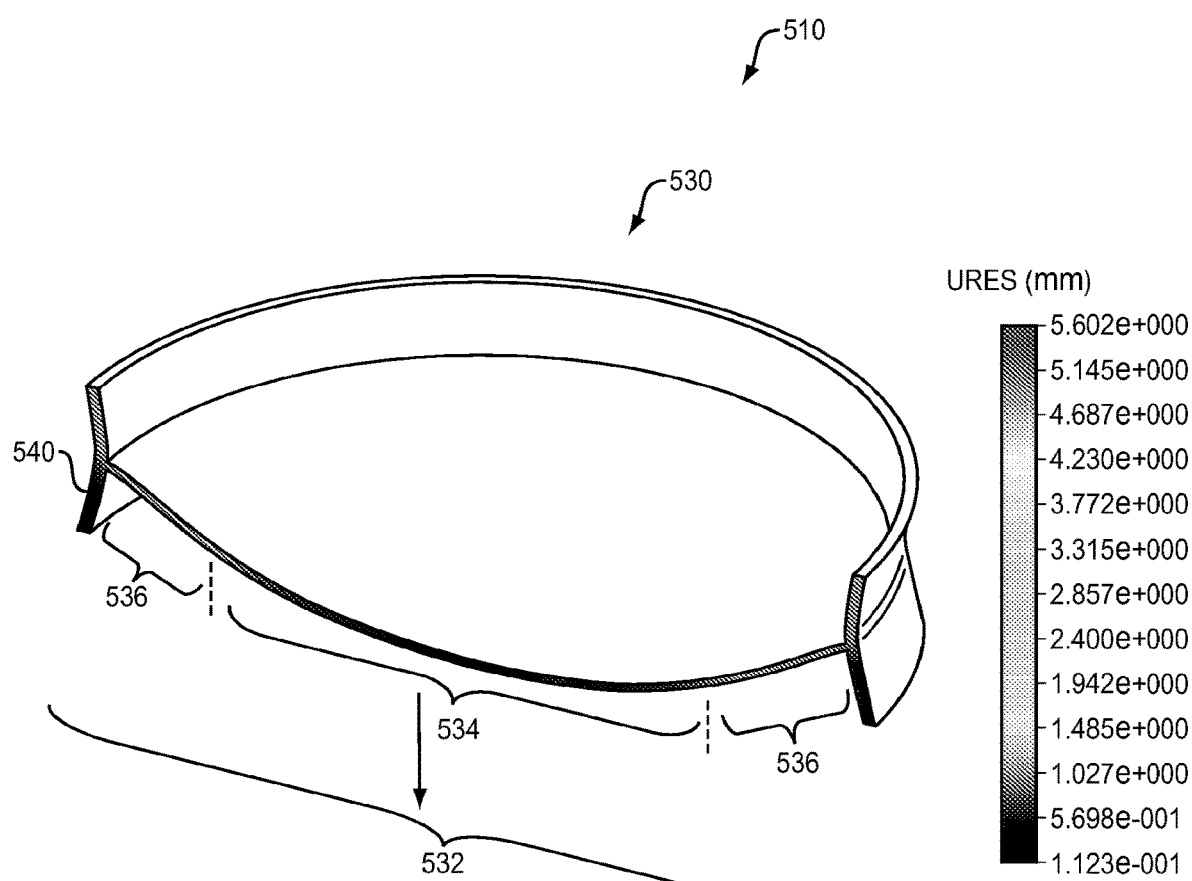
FIG. 7 is a perspective cross-section view of the bottom portion of the model of FIG. 5 with the flexible portion of the base deflected outward away from an openable end due to a positive pressure differential.

Referring now to FIGS. 5 to 7, FIG. 5 is a sectional view of a graphical representation of a model container 510, in accordance with an embodiment hereof, that was used for the finite element analysis. Features and aspects of the embodiment of FIGS. 5-7 may be used accordingly with the other embodiments. Container 510 includes a side wall 520 defining an open end 525 of the container and a closed end or base 530 opposite the open end 525. The base 530 includes a flexible portion 532 and a skirt portion 540. The flexible portion 532 includes a central region 534 that has a convex or dome shape extending outwardly, away from the open end 525, and also includes a peripheral region 536 which joins the flexible portion 532 and the side wall 520. FIG. 6 depicts a base portion 530 of the model container 510 of FIG. 5 showing a graphical representation of the computational results of an FEA in which the model container 510 is subjected to a negative pressure differential. As shown in FIG. 6, the FEA predicted that, when the container 510 is under a negative pressure differential, the flexible portion 532 of the base 530 would deflect inwardly. FIG. 7 depicts the base portion 530 of the model container 510 of FIG. 5 showing a graphical representation of the computational results of an FEA in which the model container was subjected to a positive pressure differential. As shown in FIG. 7, the FEA predicted that, when the model container 510 is under a positive pressure differential, the flexible portion 532 of the base 530 deflects outward beyond its initial configuration, which is shown in FIG. 5. It should be appreciated that container 510 is depicted in an unfilled and unsealed configuration for illustrative/finite element analysis purposes, and that that during an actual retort process, container 510 would be filled and sealed with a suitable lid, for example lid 450 shown in FIG. 4.

An example of the model container 510 that was predicted to have a large useful volume range using finite element analysis has the parameters listed below:

Height H: 100.6 mm
Side wall diameter $D_{SW}$: 74.10 mm
Side wall thickness $T_{SW}$: 1 mm
Flexible Portion Diameter $D_{FP}$: 69.5 mm
Flexible Portion Thickness $T_{FP}$: 0.75 mm
Central Region "Dome" Radius of curvature $R_{CR}$: 75 mm
Central Region Diameter $D_{CR}$: 45.25 mm
Peripheral Region "Dish" Radius $R_{PR}$: of curvature 58.7 mm
Useful Range of Deflection: 12 mm
Useful Volume Range: 16 ml (3.9% of total volume)

Figure 8:
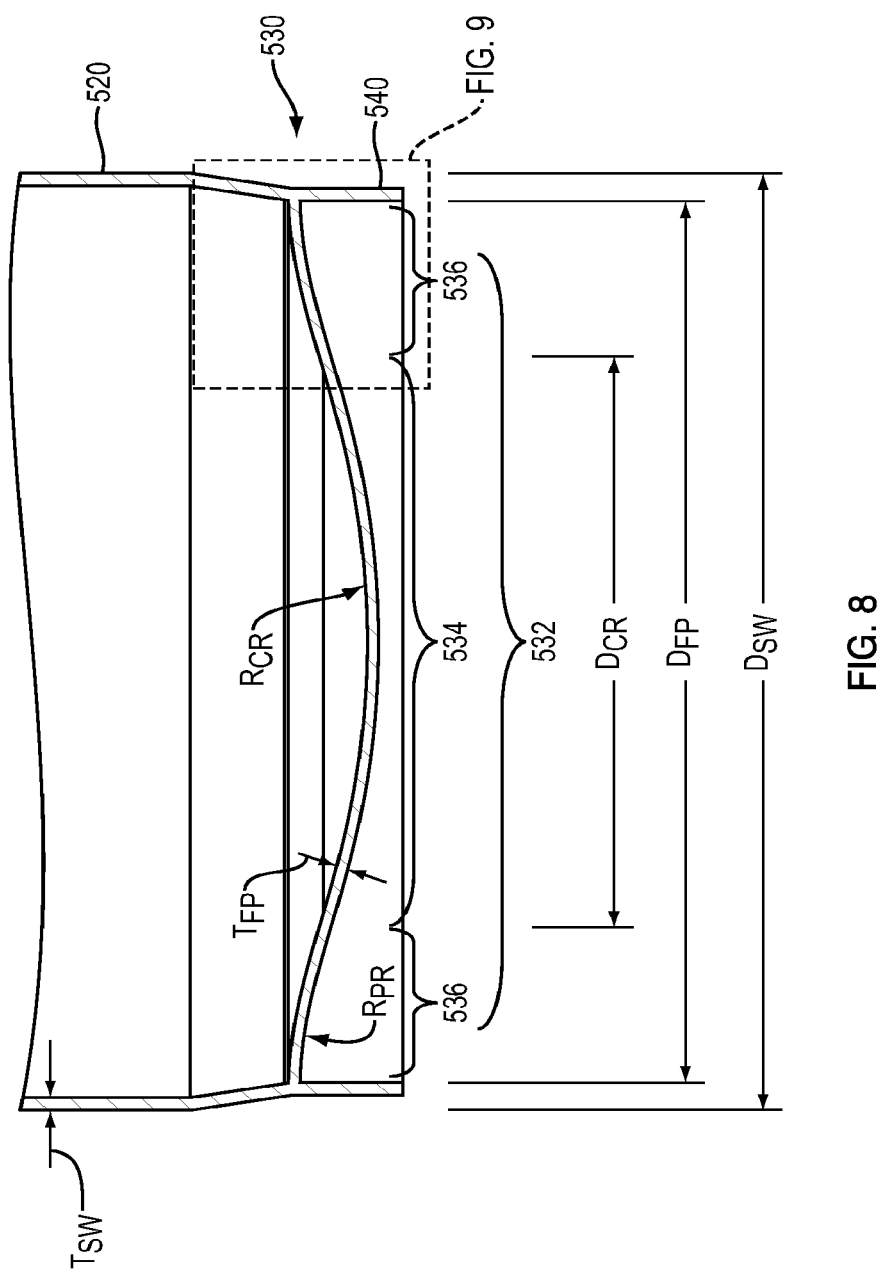
FIG. 8 is a cross-sectional view of the base portion of the model container of FIG. 5.
Figure 9:
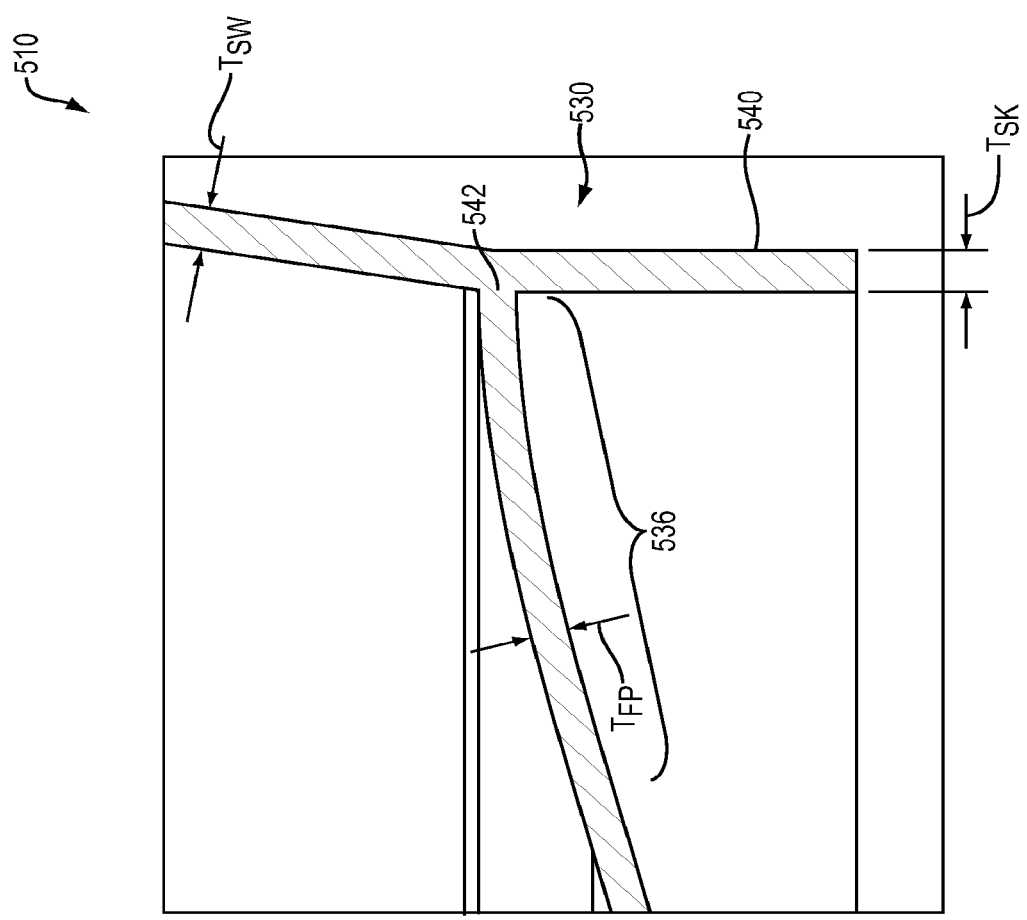
FIG. 9 is an enlarged view of a portion of FIG. 8.

FIG. 8 is a sectional view of the base portion 530 of the model container 510 and FIG. 9 is an enlarged view of a portion of FIG. 8. As depicted in FIG. 8, the central region 534 of the flexible portion 532 has a diameter $D_{CR}$ of 45.25 mm and a radius of curvature of +74.6 mm (a curvature of about 0.0134 $mm^{-1}$). The peripheral region 536 of the flexible portion 532 has a radius of curvature of -58.7 (a curvature of about -0.0170 $mm^{-1}$). For the example container, a ratio of the radius of curvature of the central region 534 to the radius of curvature of the peripheral region 536 is about 1.28:1. In some embodiments, the ratio of the radius of curvature of the central region 534 to the radius of curvature of the peripheral region 536 falls in a range of 1.1:1 to 1.5:1. In some embodiments, the ratio of the radius of curvature of the central region 534 to the radius of curvature of the peripheral region 536 falls in a range of 0.5:1 and 3:1. A suitable value for the radius of the radius of curvature of the central region 534 to the radius of curvature of the peripheral region 536 depends on the container geometry, filing conditions and retort conditions.

In the example parameters for model container 510 listed above, the projected areas of the central and peripheral regions 534, 536 are about 42.5% and 57.5%, respectively, of the total projected area of the flexible portion 532. In some embodiments, the projected area of the central region 534 falls within a range of about 40% to 45% of the total projected area of the flexible portion 532. In some embodiments, the projected area of the central region 534 falls within a range of about 38% to 47% of the total projected area of the flexible portion 532. In some embodiments, the projected area of the central region 534 falls within a range of about 36% to 49% of the total projected area of the flexible portion 536. In some embodiments, the projected area of the central region 534 falls within a range of about 20% to 80% of the total projected area of the flexible portion 532. The projected area of the central portion 534 relative to the total projected area of the flexible portion 532 depends on the can geometry.

For the modeled and tested containers, the inventors determined that a flexible portion 132 that enables the container to change the internal sealed volume by about 6% relative to the nominal sealed volume with the flexible portion undeflected was able to withstand the retort processes used without obvious deformation of the sidewalls of the container. In some embodiments, the flexible portion is configured to deflect to change an internal sealed volume by about 6% relative to a sealed volume with the flexible portion undeflected. In some embodiments, the flexible portion is configured to deflect to change an internal sealed volume by about 5% to 7% relative to a sealed volume with the flexible portion undeflected. In some embodiments, the flexible portion is configured to deflect to change an internal sealed volume by about 4% to 8% relative to a sealed volume with the flexible portion undeflected. In some embodiments, the flexible portion is configured to deflect to change an internal sealed volume by about 3% to 9% relative to a sealed volume with the flexible portion undeflected.

The volume change needed in the container to prevent obvious sidewall deformation and maintain container integrity depends on container geometry, fill conditions, and retort conditions. For example, some combinations of low filling temperature, low retort temperature, and low headspace vacuum at seaming require only 3% volume change to maintain can integrity. As another example, some combinations of high filling temperature and high headspace vacuum at seaming require as much as 9% volume change to maintain can integrity. The example container described below accommodated a 6% volume, and testing described below demonstrated that the 6% volume change was suitable to prevent obvious container deformation for a wide range of retort processing conditions.

Figure 10:
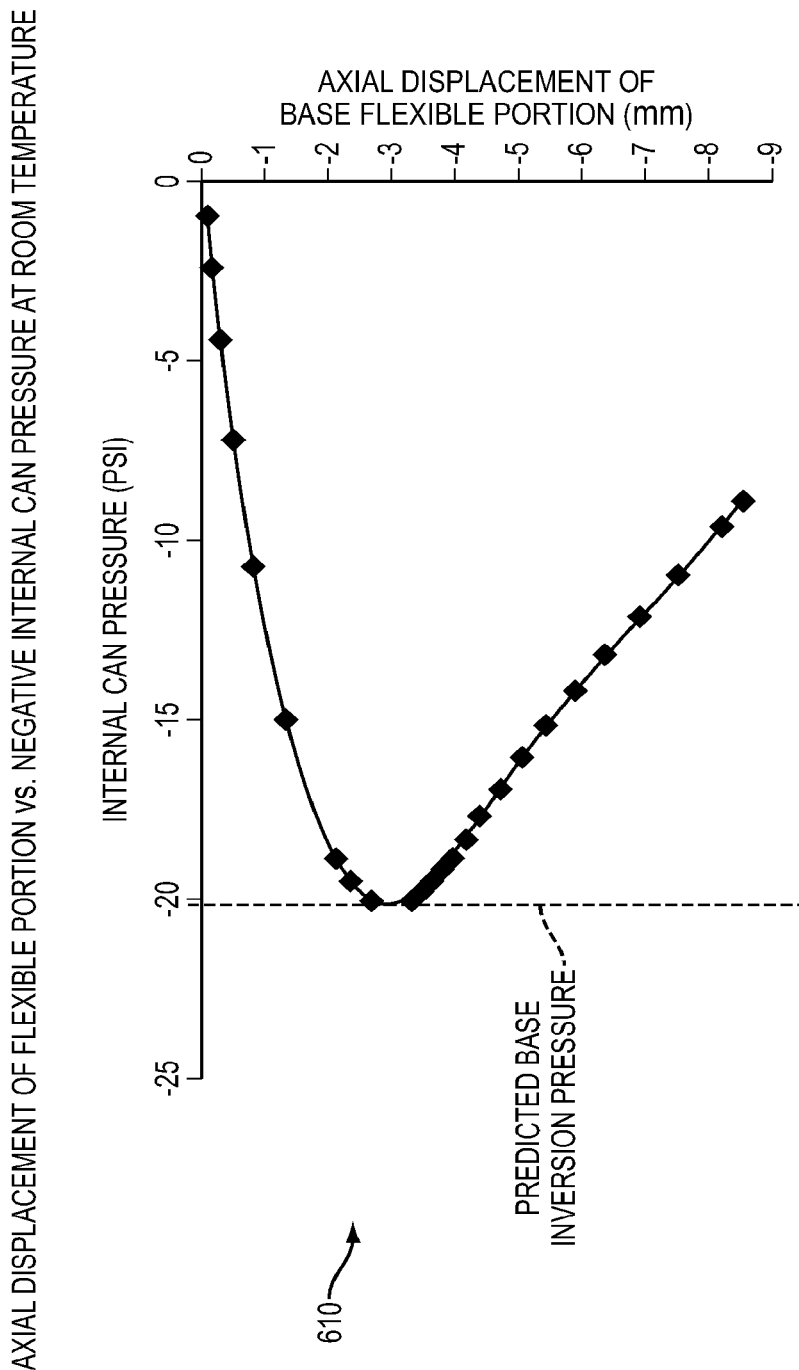
FIG. 10 is a graph of predicted axial displacement of the base as a function of negative internal container pressure for the example container of FIG. 5.
Figure 11:
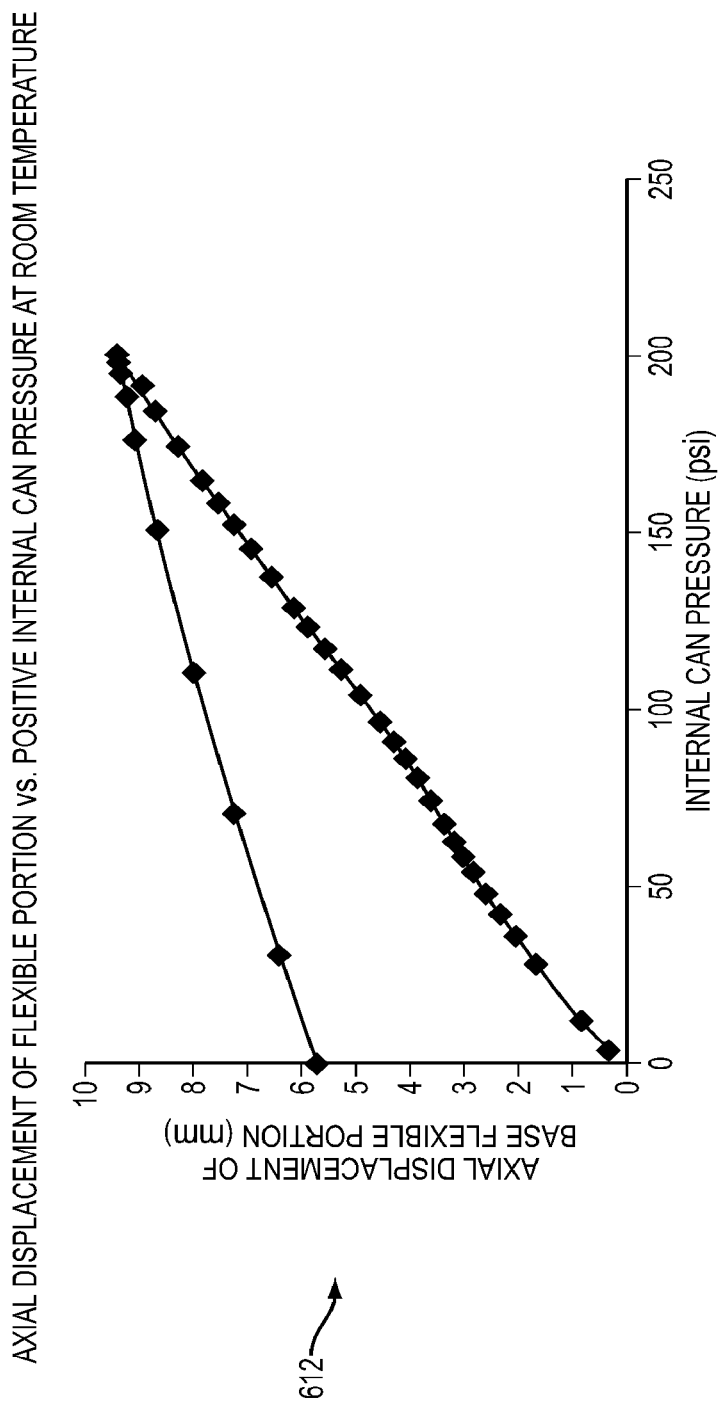
FIG. 11 is a graph of predicted axial displacement of the base as a function of positive internal container pressure for the example container of FIG. 5.

During finite element analysis, the relationship between internal container differential pressure and displacement of the flexible portion 532 was explored. Through modeling, the inventors determined that increasing the curvature of the central region 534 would increase the volume change that can be accommodated by the flexible portion 532; however, the increased curvature increased the internal pressures required to deflect the flexible portion 523 from its convex outwardly deflected state to its concave inwardly deflected state. The inventors modeled and experimented with other container designs having a central region with a concave shape inwardly extending as molded; however, the inventors determined that containers having an initial "as molded" or "as formed" outwardly extending central region provided better performance. FIGS. 10 and 11 are graphs that show finite element analysis modeling of a relationship between internal container pressure and displacement of the flexible portion 532 with the container 510 at room temperature. However, it is noted that the differential container pressures required for displacement of the flexible portion 532 are higher at room temperature than the differential container pressures required for displacement of the flexible portion 532 in an actual retort process at retort temperatures. FIG. 10 shows a graph 610 of the axial displacement of the flexible portion 532 of the model container 510 as for various negative internal container pressures at room temperature. As shown in FIG. 10, for displacements of flexible portion 532 up to −3 mm, greater internal container pressures are required than for displacements of flexible portion 532 that are greater than −3 mm. At deflections beyond −3 mm the central region 534 of the flexible portion 532 has inverted, i.e., from being convex to being concave. Once the flexible portion 532 has inverted, less internal can pressure is required to further displace the flexible portion 532. For example, as shown in FIG. 10 about −20 psi was required for the first 3 mm of deflection; however, once the flexible portion 532 inverted, the amount of negative internal can pressure required to further deflect the flexible portion 532 was reduced.

FIG. 11 is a graph 612 showing axial displacement of the flexible portion 532 of the model container 510 resulting from positive container internal pressure at room temperature. In this model, the positive internal container pressure was increased from 0 to 200 psi and then decreased back to zero psi. As shown, the axial displacement of the flexible portion 532 starts at 0 mm and increases to over 9 mm when the container 510 is pressurized to 200 psi. Subsequent lowering of the container internal pressure back to zero psi did not return of the flexible portion 532 back to its initial state of zero deflection, indicating that plastic deformation of the flexible portion 532 had occurred when the container 510 was subjected to a positive internal pressure of about 200 psi.

FIGS. 10 and 11 show the effects of internal container pressure (in a range between about −20 psi and +200 psi) on the model container 510. However, FIGS. 10 and 11 were based on FEA simulations in which the container 510 was in a room temperature environment with external atmospheric pressure and without other external pressurization. In some frequently used retort processes the retort chamber is pressurized, and the elevated temperature in the retort chamber, which increases the internal container pressure, softens the flexible portion sufficiently that the deflection thereof accommodates the pressure changes within the container by changing the container's internal volume, such that the likelihood of the container experiencing a detrimental differential or internal pressure is reduced.

Figure 12:
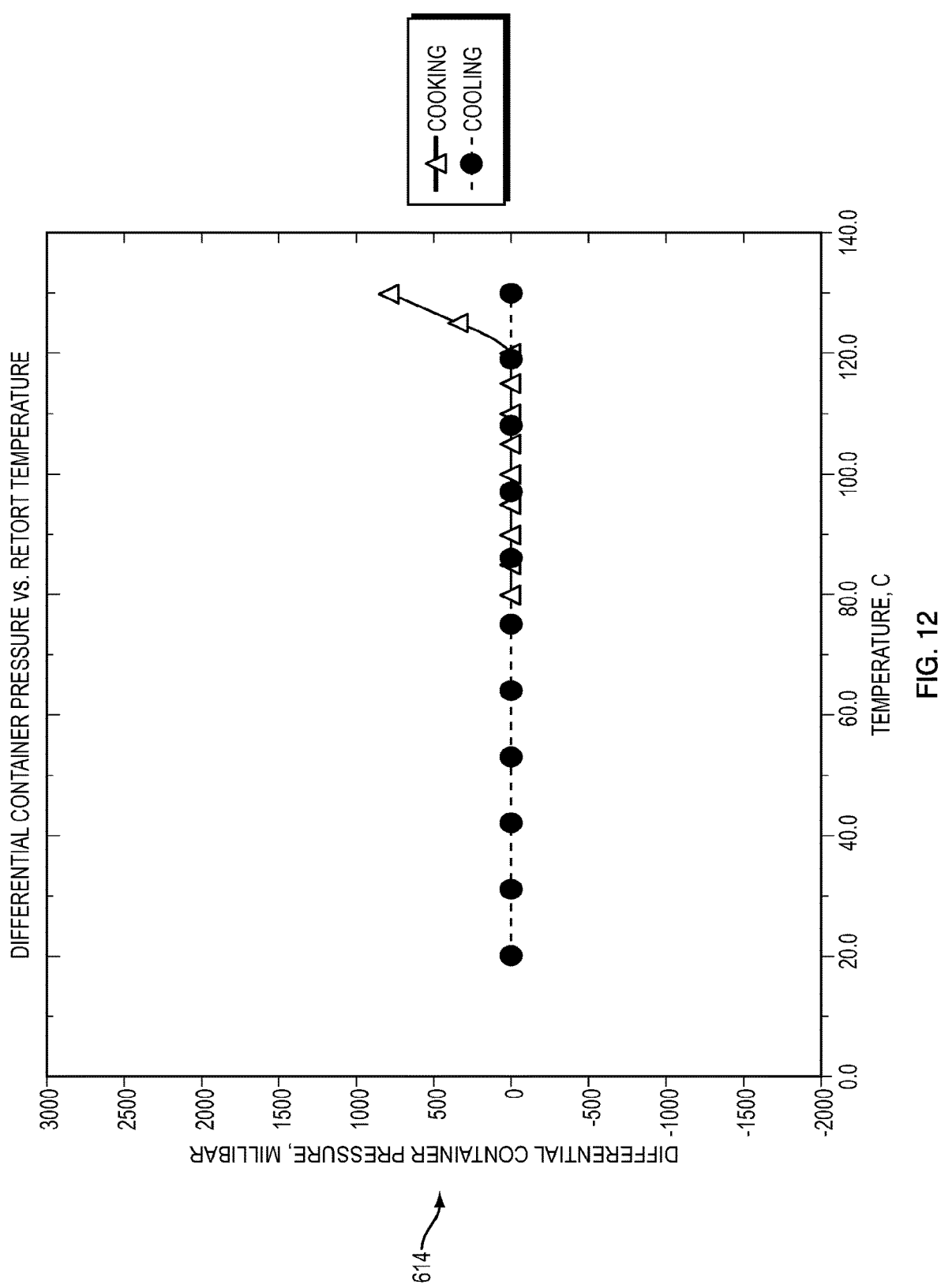
FIG. 12 is a graph of predicted differential container pressure as a function of temperature during a retort process for the example container of FIG. 5.
Figure 14:
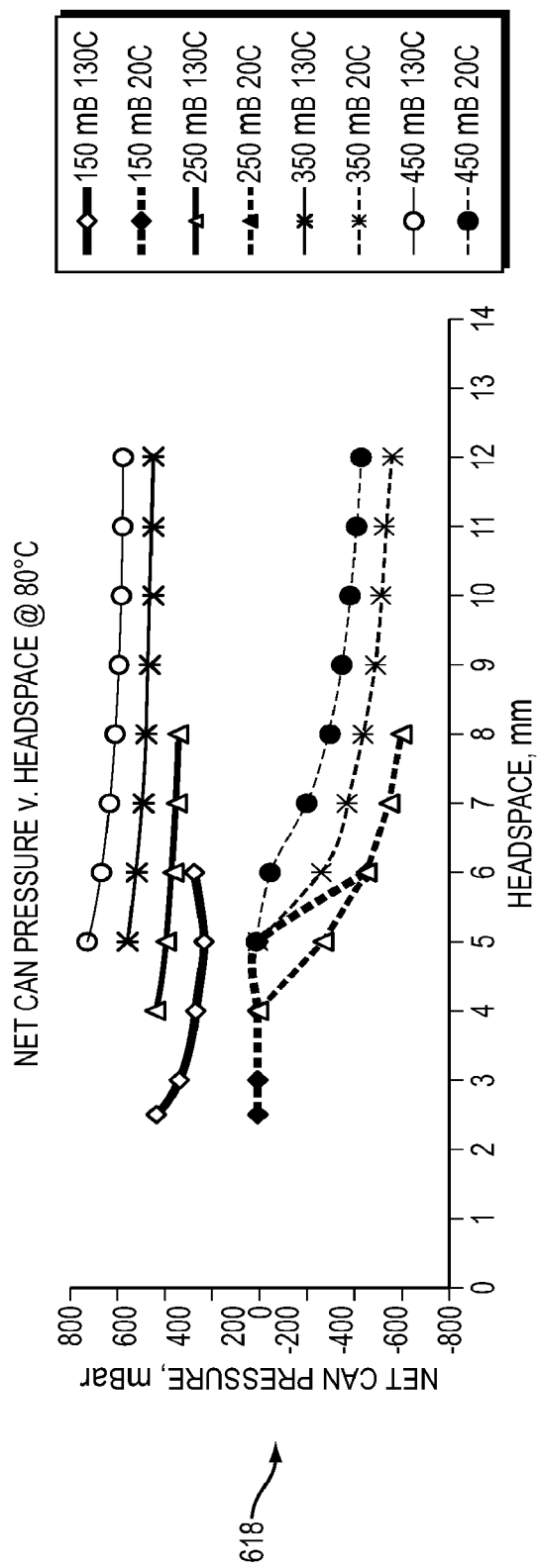
FIG. 14 is a graph of predicted differential pressure as a function of head space for the example container of FIG. 5 for filling at 80° C. and different internal container pressures at sealing.

FIGS. 12 to 14 include graphs based on calculations performed by the inventors using the information learned from the finite element analysis described above. In the discussion regarding FIGS. 12 to 14 references to a container or features thereof are described with reference to container 110 solely for illustrative purposes. The parameters of the model container used to generate the data in FIGS. 12-14 are included in the table below.

| Can Geometry | |
|---|---|
| Can Height | 100.6 [mm] |
| Can Diameter | 72.1 [mm] |
| Can Wall | 1.00 [mm] |
| Base Flex-in | −24 [ml] |
| Base Flex-out | 3 [ml] |
| Inside the Can Head Space | 6.0% [of Can Volume] |
| Can Volume | 411 [ml] |

The processing parameters used to generate the data in FIGS. 12 and 13 are included in the table below.

| Fill Conditions | | |
|---|---|---|
| Contents temperature at filling | 80 [C.] | Vacuum Seamer |
| Can % temp rise from R.T. before seaming | 65% | Setting 5.8 |
| Can temperature at seaming (calculated) | 61 [C.] | Inches Mercury below atmospheric |
| Headspace air pressure at seaming | 500 [millibar] | |
| Headspace, mm | 6.0 [mm] | |
| Headspace, ml | 24 [ml] | |
| Retorting Conditions | 130 [C.] | |

FIG. 12 is a graph 614 based on the inventors' calculations of the differential pressure in the model container 510 as a function of temperature during the heating and cooling of the container in an example retort process. Through most of the temperature range from 20° C. to 130° C., the deflection of the flexible portion 132 of the base 130 acts to keep a differential pressure of the container 110 at or near zero. However, at temperatures above about 120° C., the container 110 exhibits an appreciable differential pressure.

FIG. 13 is a graph 616 based the inventors' calculations of the net volume change of the container 110 during the retort process, and illustrates how deflection of the flexible portion 132 and corresponding changes in the container volume act to reduce the differential pressure in the container 110. The container 110 has an initial volume $V_0$ immediately after filling with contents at elevated temperature and sealing. As shown in FIG. 13, the sealed container 110 within the retort chamber experiences a reduction in container volume down to a first volume $V_1$ due to a negative differential pressure created by an initial increase the pressure within in the retort chamber that pushes the flexible portion 132 inward. At first volume $V_1$ the flexible portion 132 of the base 130 does not reach the limit of its completely flexed-in state, which is indicated by dotted line 617 at −24 ml, at which point, further negative pressure within the container 110 may cause the container 110 to exhibit some paneling or collapsing. As the container 110 is heated and the internal container pressure and the external retort pressure reach equilibrium, the flexible portion 132 deflects outward and the container volume increases until it bypasses its initial volume $V_0$. As the temperature increases beyond 120° C., pressure within the container increases and the flexible portion 132 of the container 110 reaches the limit of its flexed-out state, as indicated by the flatting of the curve at about 120° C. At the limit of the flexed-out state, the container 110 has a second volume $V_2$. Because the flexible portion 132 cannot further deflect to counteract the increasing positive pressure within the container, the pressure differential increases (as shown in FIG. 12) and the container may temporarily exhibit some bulging of the side walls 120. During cooling, the container volume decreases to a final volume $V_F$ at room temperature, which is less than the initial container volume $V_0$ for this embodiment of the container 110 and these particular processing conditions. As the container cools from about 75° C. to 65° C., its volume increases to a value between $V_0$ and $V_F$ as a result of the retort chamber being opened and pressure on the outside of the container 110 reducing to atmospheric pressure.

The net pressure differential during the retort process, the volume changes during retort, and the final volume depend on, inter alia, the properties of the container 110, the contents of the container, details of the retort process, and details regarding the filling of the container 110. The inventors explored how the initial headspace in the container upon filling and the initial pressure of the container upon sealing affected the differential pressure at the maximum retort temperature (e.g., 130 C) and at room temperature 20 C. The results appear in FIG. 14. In the data shown in FIG. 14, the following fill parameters were used:

Contents temperature at filling: 80° C.
Can % temp rise from R.T. before seaming: 65%
Can temperature at seaming: 61° C.
Vacuum Seamer Setting: 150 mb to 450 mb FIG. 14 is a graph 618 based the inventors' calculations showing differential pressure at 130° C. and at 20° C. for filled containers having different head spaces and different internal container pressures at sealing. Internal container pressure at sealing can be affected by, inter alia, adjusting the air pressure in the head space by, for example, by performing the sealing operation in a pressure controlled environment i.e. vacuum seaming, or by steam flushing the open end of the container 110 prior to sealing. As shown in the graph, the positive differential pressures at retort temperature have some dependence on the head space at sealing, but are greatly affected by the pressure at sealing, with higher pressures at sealing resulting in higher positive pressure differentials at retort temperatures.

As shown in the graph, the negative pressure differentials at room temperature are greatly affected by the headspace at sealing for larger head spaces (e.g., for head spaces larger than 4-5 mm). At room temperature, the sealing pressure seems to significantly affect the negative pressure differentials for larger headspaces. In view of the data in FIG. 14, to decrease the maximum positive pressure differential and the maximum negative pressure differential experienced by a container, for example, container 110 with this configuration during retort processing with sealing at 80° C., the head space should be kept relatively small (e.g., between 2 mm and 6 mm) and the sealing pressure should be kept relatively low (e.g., less than 350 mb or less than 250 mb). For other container geometries and sealing at other temperatures, the graph of differential container pressure versus headspace is different, and other ranges for headspace and pressure at sealing may be suitable.

The inventors made example containers in accordance with the embodiments hereof, which were filled, sealed with a lid, and tested in order to compare the performance of the model container 510 with the performance of the actual containers.

Figure 16:
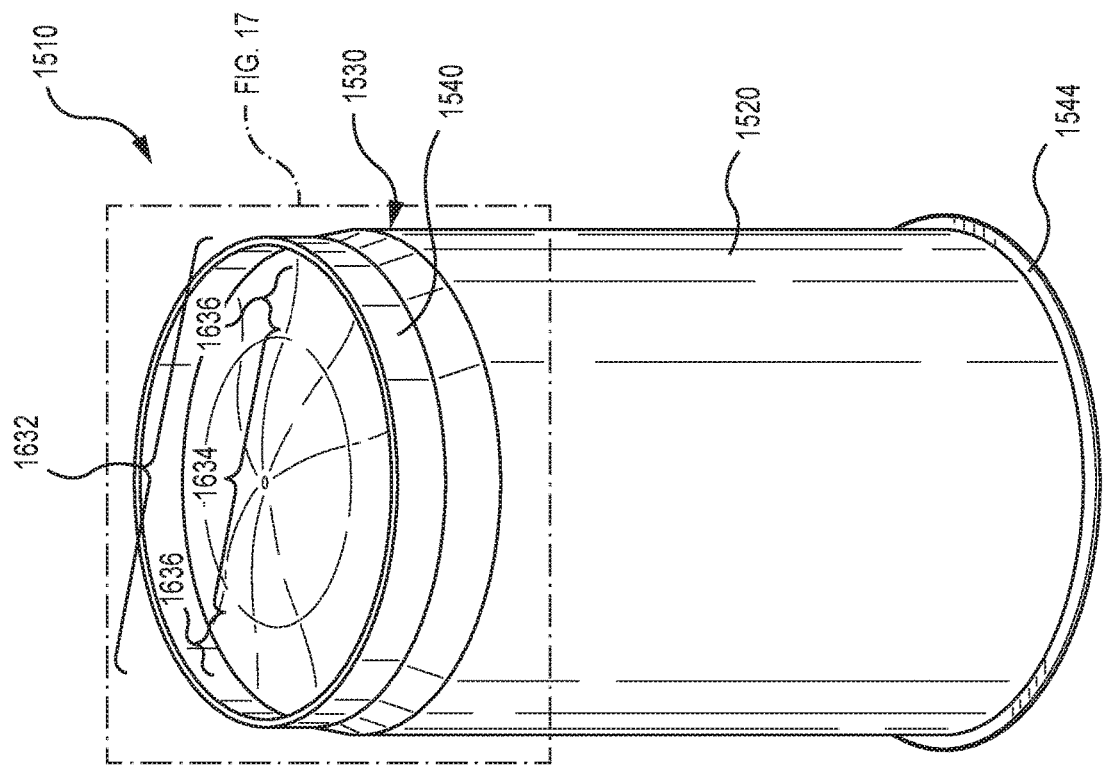
FIGS. 15 and 16 are perspective images of manufactured example containers, in accordance with an embodiment.
Figure 15:
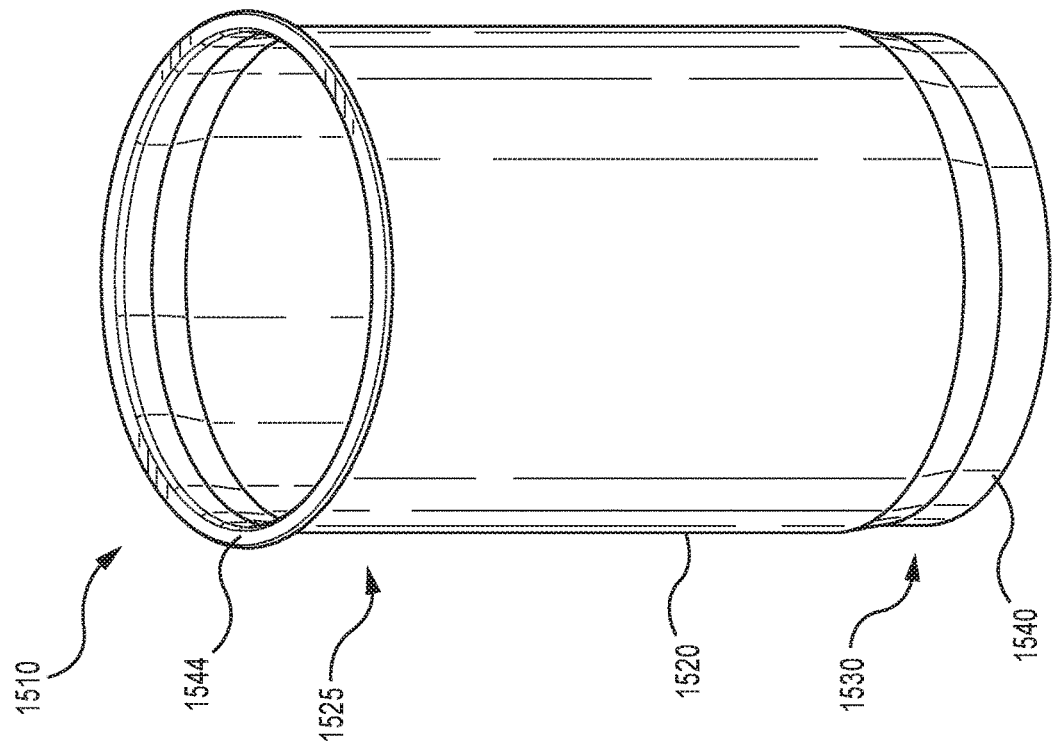
Figure 17:
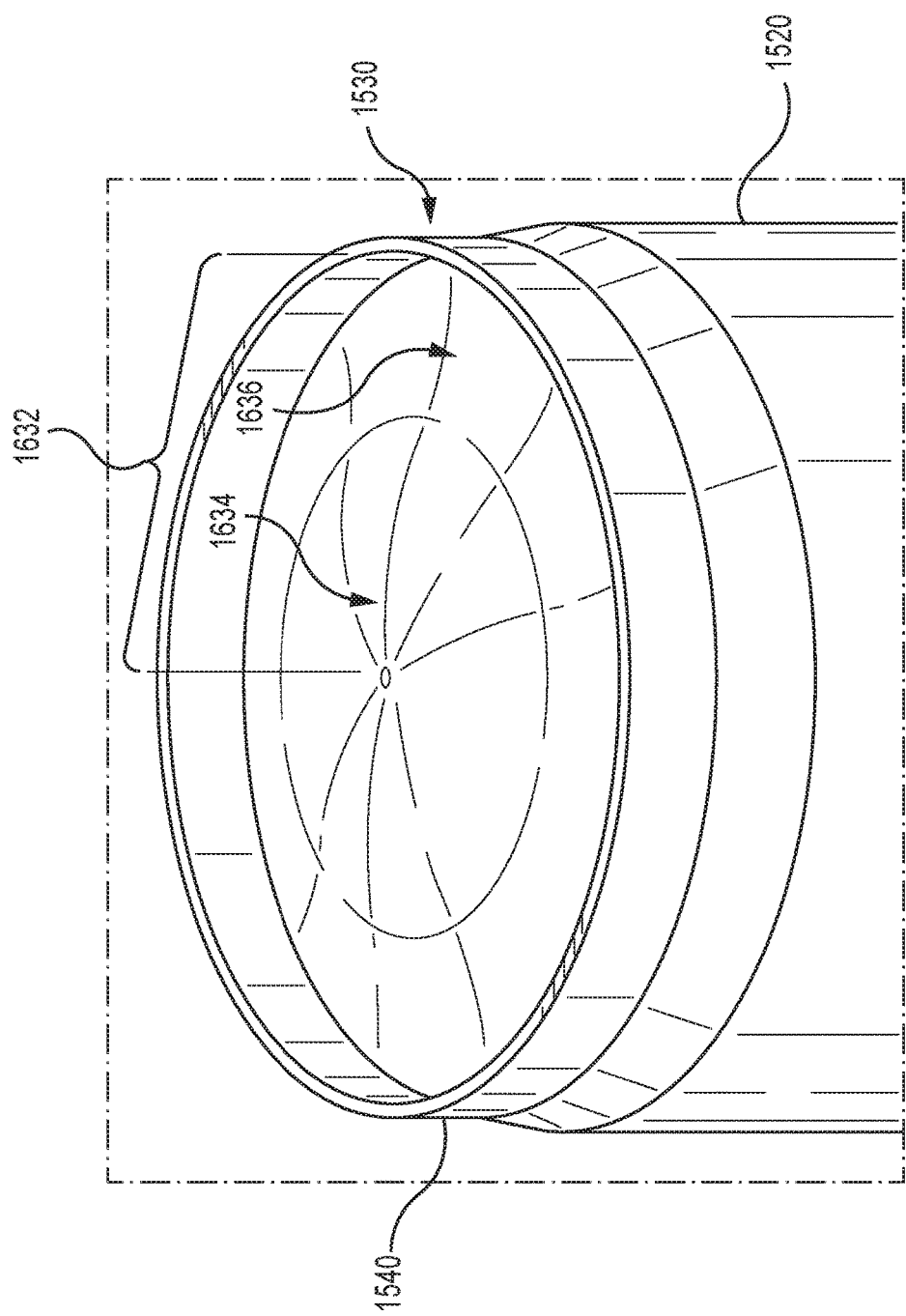
FIG. 17 is an enlarged view of a portion of the image of FIG. 16.

FIGS. 15-17 are images of an example container 1510 in accordance with an embodiment hereof that was made by the inventors. Features and aspects of the example embodiment may be used accordingly with the other embodiments. In FIG. 15, the container 1510 is resting on its skirt portion 1540, whereas in FIG. 16 the container 1510 is resting on its flange portion 1544. FIG. 17 is an enlarged view of a portion of FIG. 16. The container 1510 includes a side wall 1520 defining an open end 1525 of the container and a closed end or base 1530 opposite the open end 1525. The base 1530 includes a flexible portion 1632 (visible in FIG. 16) and a skirt portion 1540. The flexible portion 1632 includes a central region 1634 that has a convex or dome shape and also includes a peripheral region 1636 which joins the flexible portion 1632 and the side wall 1520. The positive and negative curvatures of central and peripheral regions 1634, 1636, respectively, can be seen in FIG. 17. The containers 1510 were made using a multilayer co-injection process in which the containers 1510 have inner and outer "skin" layers of polypropylene surrounding an interior or core layer of EVOH. The containers 1510, not including the metal lids, were 92 wt % (94 vol %) of a mixture of PP with BYNEL® (an adhesive resin produced by DUPONT®) and 8 wt % (6 vol % EVOH). The inner and outer skin layers were formed of the PP/BYNEL mixture and the interior core layer was formed of EVOH. For the containers 1510, the proportions of the PP/BYNEL mixture fell within a range of 5 wt % to 8 wt % BYNEL. The BYNEL adhesive resin used for the example containers included 99% PP and about 1% maleic anhydride. The multi-layer structure of the container 1510 is similar to that of the container 410 depicted in FIG. 4.

Figure 19:
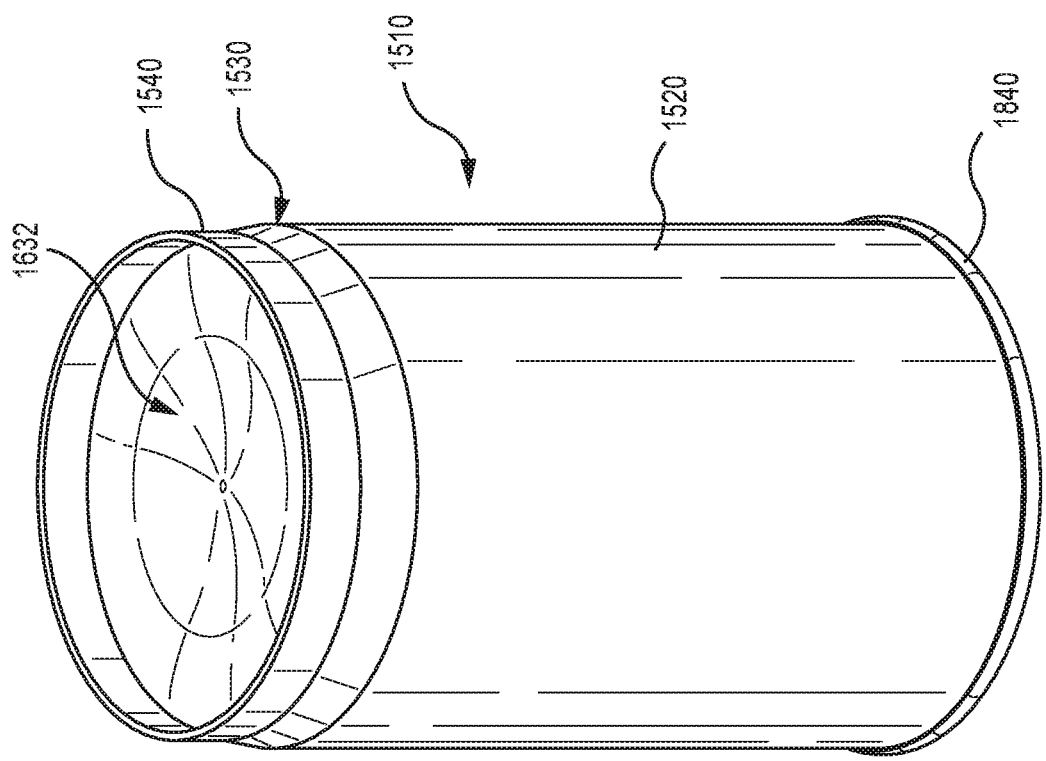
FIGS. 18 and 19 are perspective images of a sealed example container after a retort process.
Figure 18:
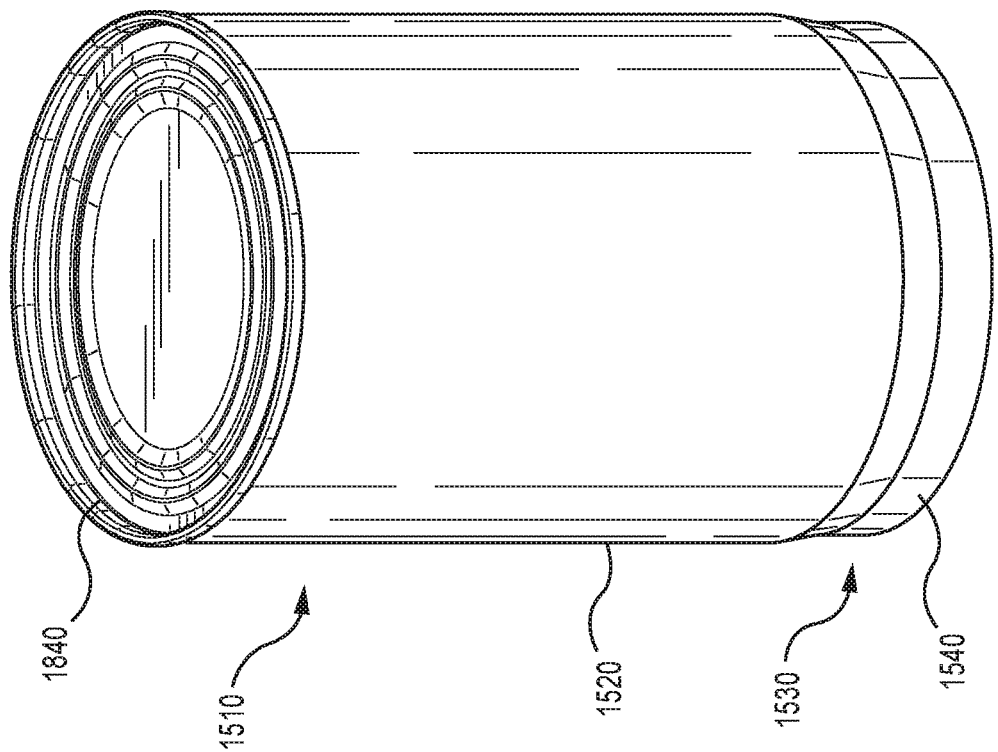

The flange 1544 of the test containers 1510 was configured to be sealed with a double seamer. The test containers 1510 were configured such that they could be sealed using a conventional double seamer designed to seal conventional metal lids on conventional metal cans. FIGS. 18 and 19 are images of one of the plastic containers 1510 sealed with a metal double seam sanitary open top (SOT) end or lid 1840 and after retort processing. In FIG. 18, the container 1510 is resting on its skirt 1540 such that it is in a metal lid up orientation, and in FIG. 19, the container 1510 is resting on its metal lid 1840 such that it is in a metal lid down orientation. As can be seen in FIGS. 18 and 19, following a retort process, the sealed container 1550 shows no readily observable signs of paneling or bulging of the side wall 1520, and as shown in FIG. 19, the flexible portion 1632 of the base 1530 is in a flexed-inward concave configuration after retort processing.

The test containers 1510 were filled with various types of products (e.g., carrots, green beans, dog food, tomatoes, pineapple, etc.) and analyzed during a retort process specific to each type of product. Different types of product require different retort processes due to differing requirements for temperature required to sterilize that type of product and different rates of thermal conduction through the various products. To collect the data, one or more of the containers 1510 was outfitted with a temperature sensor and a pressure sensor that was connected to a suitable data monitoring/recording device.

FIGS. 20 and 21 are images of example test containers 2010 in accordance with an embodiment hereof, following retort processing. Features and aspects of the example embodiment may be used accordingly with the other embodiments. As shown in FIG. 20, the test containers 2010 are made from a generally transparent material, and are each filled with a different type of product (i.e., from left to right as shown in the images, peaches, dog food and carrots, respectively). Although the test containers 2010 are shown made from a generally transparent material, it should be appreciated that containers 2010 could also be made from a material that can be considered generally non-transparent. Also as shown in FIG. 20, the containers are sealed with a metal full aperture easy open end (EOE) or lid 2040. As can be seen in FIGS. 20 and 21, the test containers 2010 did not show any obvious side wall bulging or paneling deformation after undergoing retort processes that are suitable for the different types of products held therein. FIG. 21 shows that each container 2010 exhibits a different configuration of the flexible portion 2132 after retort processing. The container 2010 with the peaches (on the left in FIG. 21) has an outwardly flexed flexible portion 2132. The container 2010 with the dog food (in the middle in FIG. 21) has a relatively flat flexible portion 2132. The container 2010 with the carrots (on the right in FIG. 21) has a flexible portion 2132 with an asymmetric configuration, specifically, a sector of the flexible portion 2132 is flexed outwardly whereas the remainder of the flexible portion 2123 is relatively flat.

Figure 22:
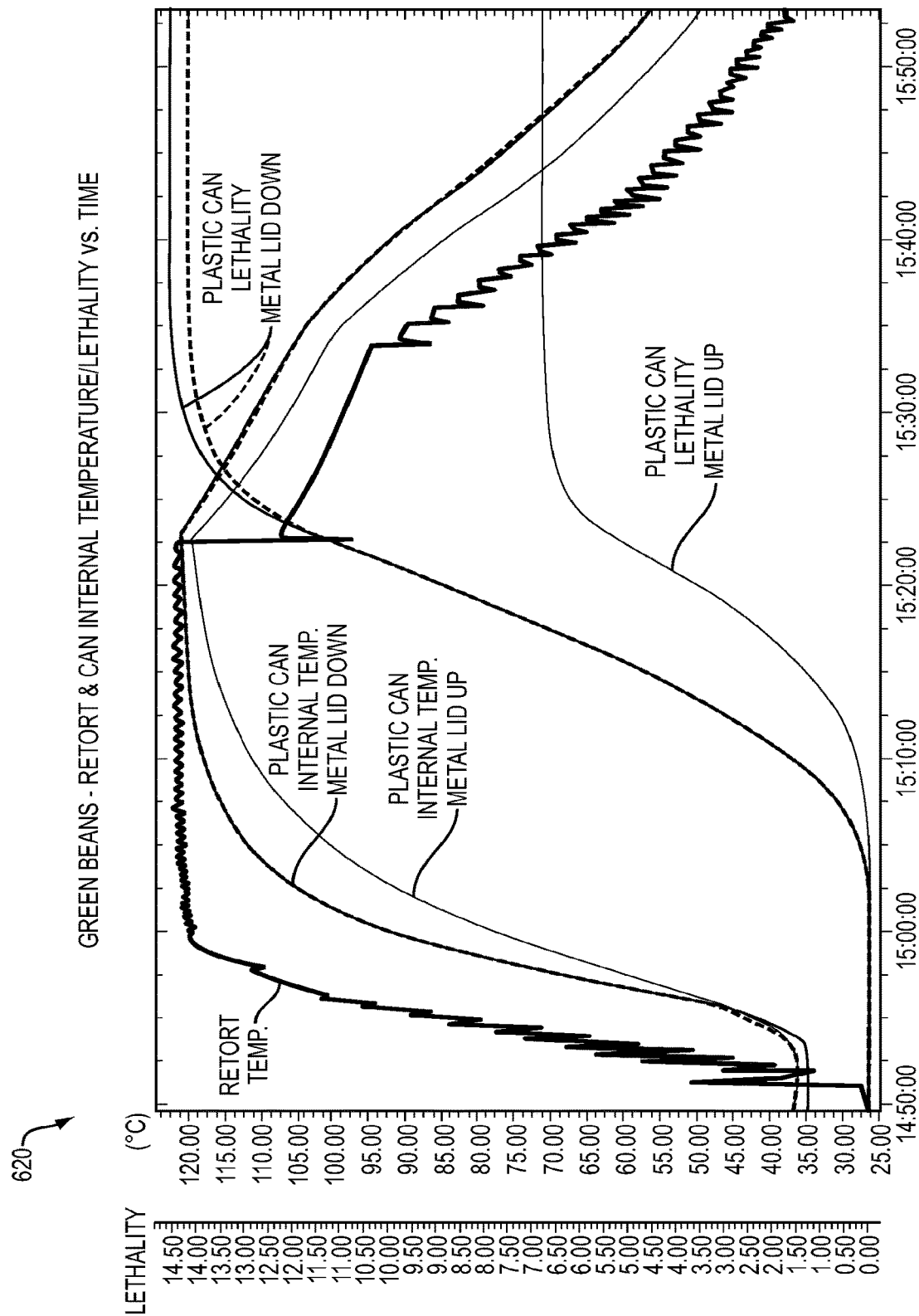
FIG. 22 is a graph of retort temperature, container internal temperature, and lethality versus time for sealed example containers filled with green beans during a retort process with the metal lid up and with the metal lid down.

FIGS. 22-33 are graphs showing data obtained from test containers, for example containers 2010, including various types of food sealed therein with a suitable lid (e.g. lid 2040), that were monitored throughout a retort process suitable for the various contents. The sealed containers 2010 may also be referred to as cans or test cans 2010. FIG. 22 is a graph 620 of data obtained from test containers 2010 filled with green beans during a retort process. The graph includes retort chamber temperature and internal can temperature as a function of time during the retort process. In the test, some cans 2010 were placed in the retort chamber in a metal lid up orientation, meaning the empty head space of the can 2010 is adjacent to the metal lid 2040, and some cans 2010 were placed in the retort chamber in a metal lid 2040 down orientation, meaning that the contents of the can 2010 were in contact with the metal lid 2040. As shown by the curves, the cans 2010 positioned lid down heated more quickly than the cans 2010 positioned lid up.

During retort processing, the effectiveness at killing the relevant microbes in the product can be expressed as the lethality. The difference in the heating rate for cans 2010 in lid up versus lid down orientations in the retort chamber translated to a difference in lethality for the cans 2010 positioned lid up as compared with the cans 2010 positioned lid down as shown by the curves in FIG. 22. Thus, the orientation of a plastic container 2010 having a metal lid during the retort process, specifically, whether the head space of the container 2010 or the product is in contact with the metal lid may impact the efficiency and/or effectiveness of the retort process. Positioning the can 2010 in a metal lid down orientation, or with at least some of the product in contact with the metal lid 2010, was more efficient than positioning the can 2010 such that the headspace is between the contents of the can 2010 and the metal lid 2010.

Figure 23:
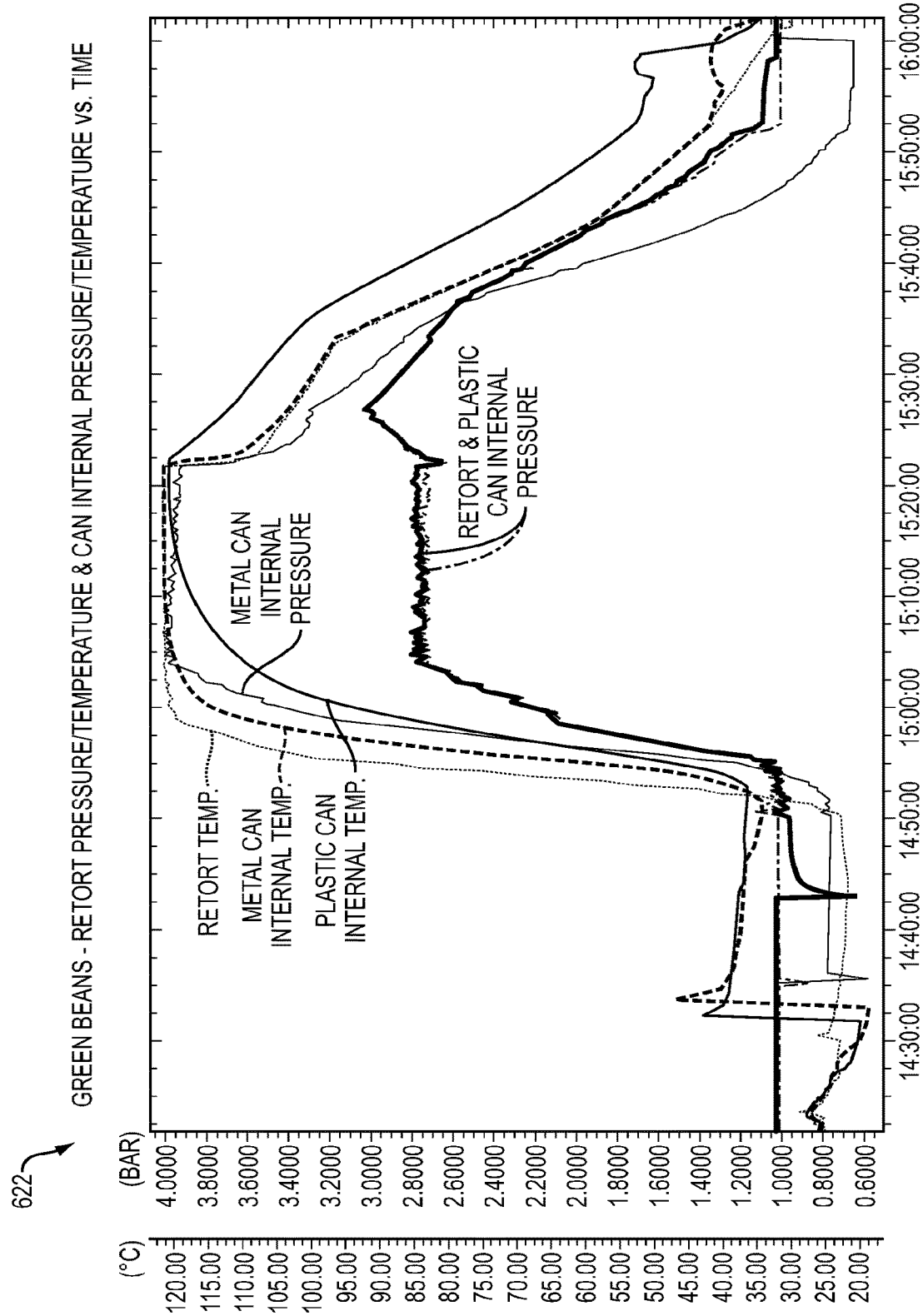
FIG. 23 is a graph of container internal temperature and container internal pressure versus time for a sealed example container with a plastic body and a metal lid and a sealed conventional all-metal container, both filled with green beans, during a retort process.
Figure 24:
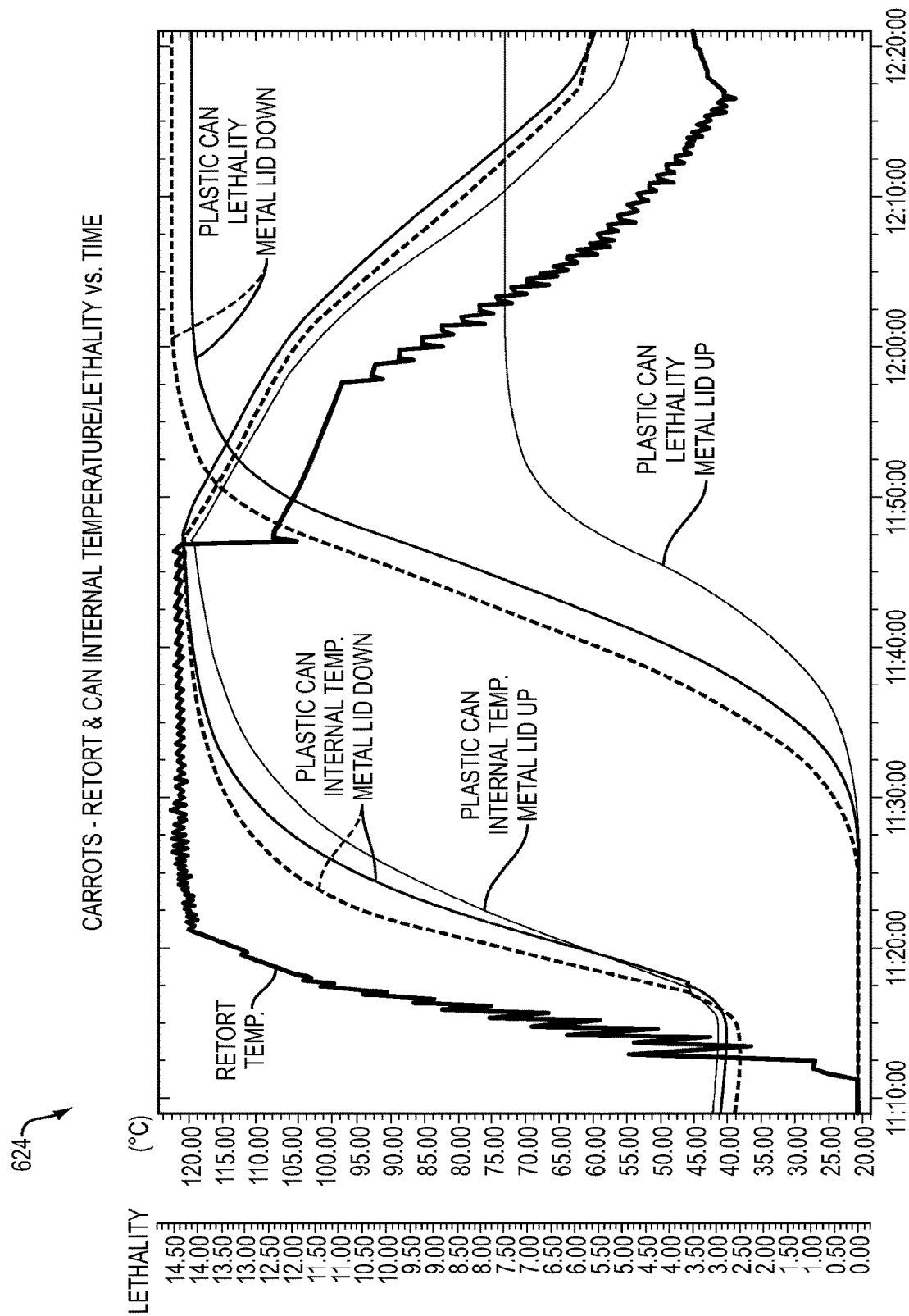
FIG. 24. is a graph of retort temperature, container internal temperature, and lethality versus time for sealed example containers filled with carrots during a retort process with the metal lid up and with the metal lid down.
Figure 25:
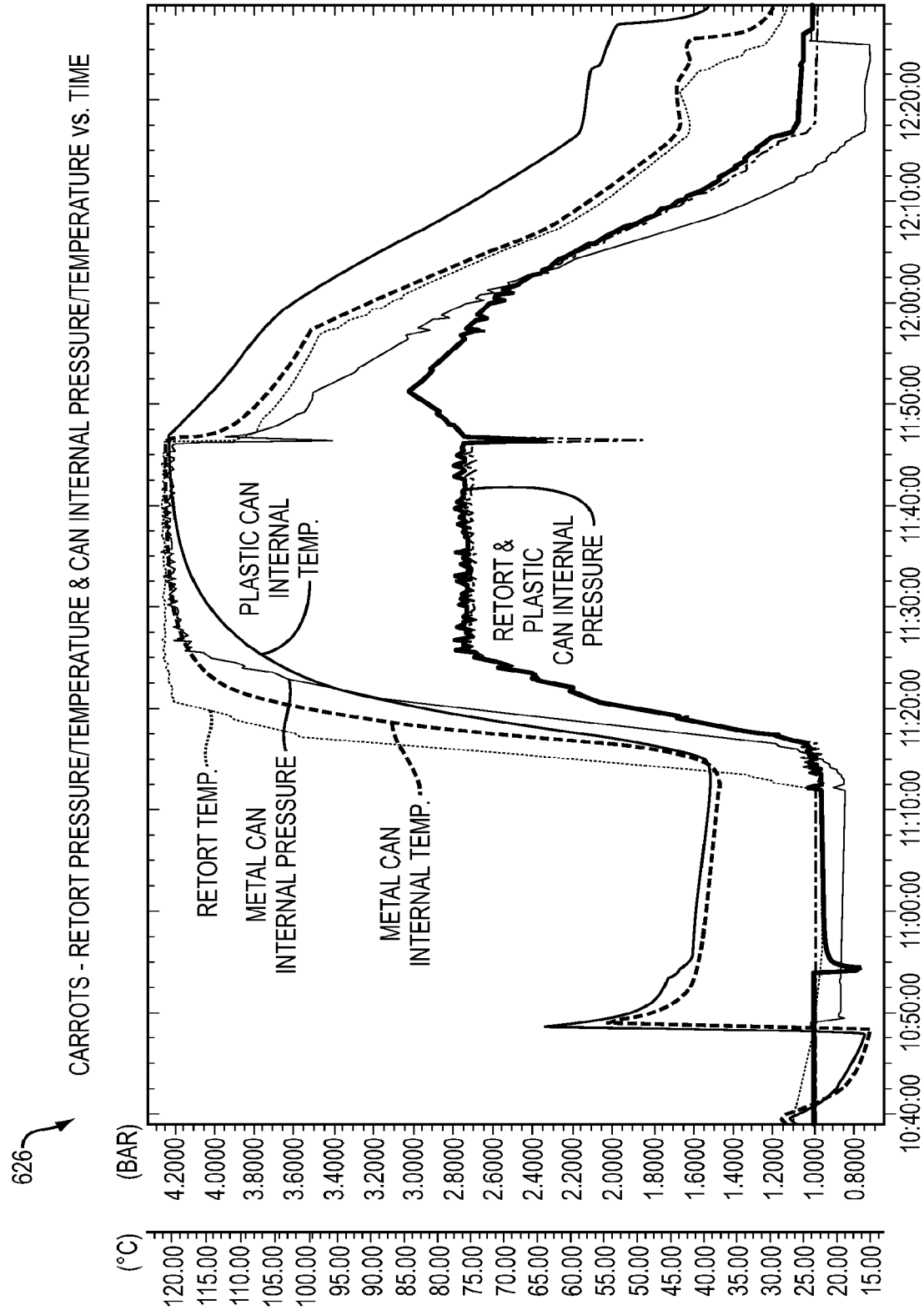
FIG. 25 is a graph of container internal temperature and container internal pressure versus time for a sealed example container with a plastic body and a metal lid and a sealed conventional all-metal container, both filled with carrots, during a retort process.
Figure 26:
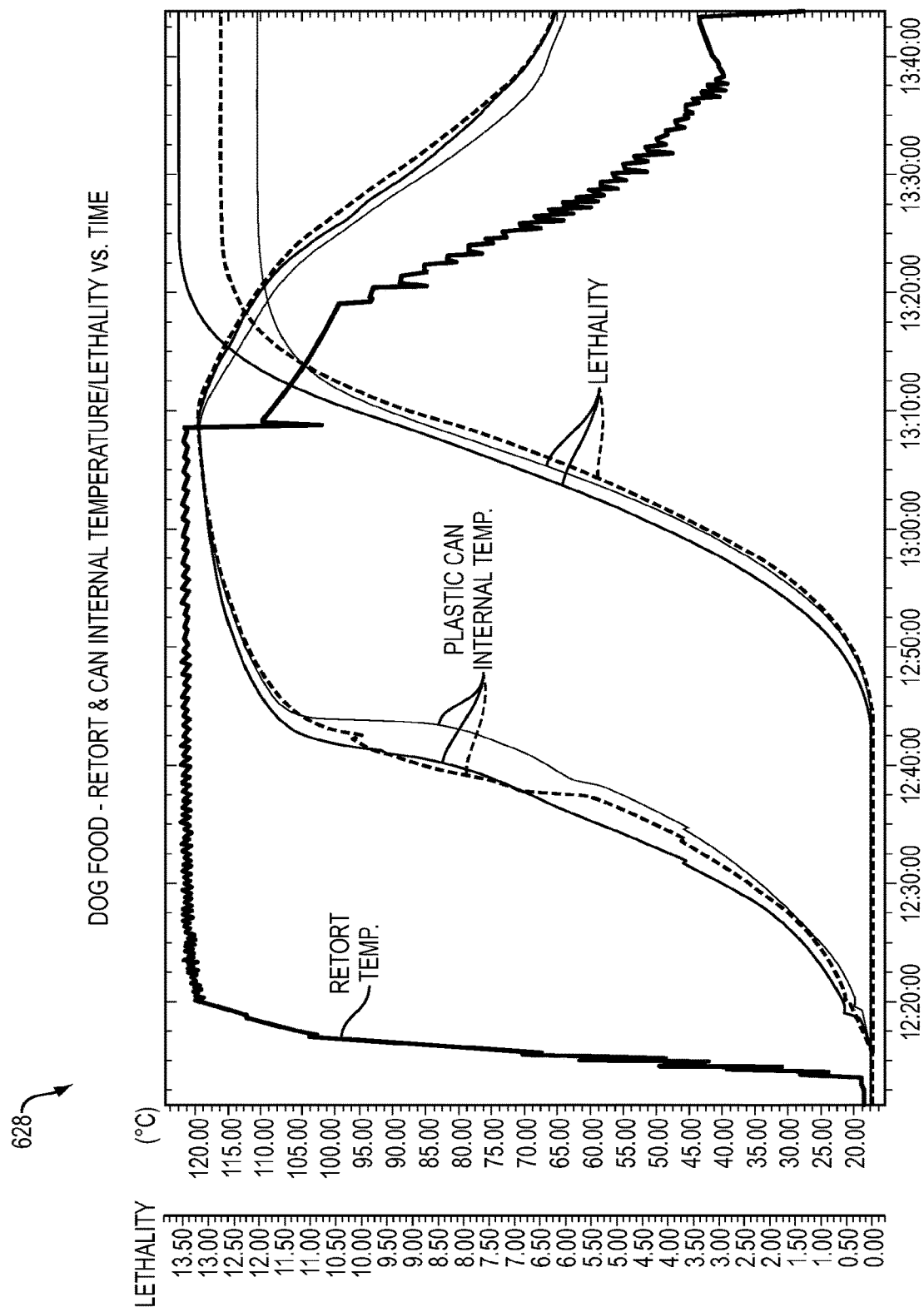
FIG. 26 is a graph of retort temperature, container internal temperature, and lethality versus time for sealed example containers filled with dog food during a retort process.

FIG. 23 is a graph 622 comparing the performance of an example plastic container 2010 having a metal lid 2040 (plastic can) with the performance of an often all metal can (metal can) during a retort process for green beans. The all metal can did heat more quickly than the example plastic can 2010, which was expected. This retort was conducted at an overpressure. The graph of the retort overpressure and the internal pressure of the plastic can practically overlay each other from time 14:50 to time 16:00 indicating the differential pressure of the plastic can 2010 was about zero throughout the retort process. In contrast, for the metal can, the internal pressure was much larger than the chamber overpressure, meaning that the metal can experienced a significant pressure differential during the retort process. For example, at time 15:10 at 120° C. the metal can had an internal pressure of about 4 bar, whereas the retort chamber had a pressure of about 2.6 bar, which is a pressure differential of about 1.4 bar or about 20 psi.

FIGS. 24-31 includes similar graphs of retort and container temperature and lethality versus time and retort and container pressure and temperature as a function of time for various products, specifically, carrots, dog food, pineapple, and tomatoes. FIGS. 24, 26, 28, and 30 are graphs 624, 628, 632, 638, of retort temperature, can internal temperature and lethality vs. time for cans filled with carrots, dog food, pineapple, and tomatoes, respectfully. FIGS. 25, 27, 29, and 31 are graphs 626, 630, 634, and 640 of retort pressure and can pressure as a function of time for metal cans and plastic cans filled with carrots, dog food, pineapple, and tomatoes, respectively. These graphs differ for different products because the timing and required retort temperature is different for different products. Also, different products conduct heat at different rates.

Figure 27:
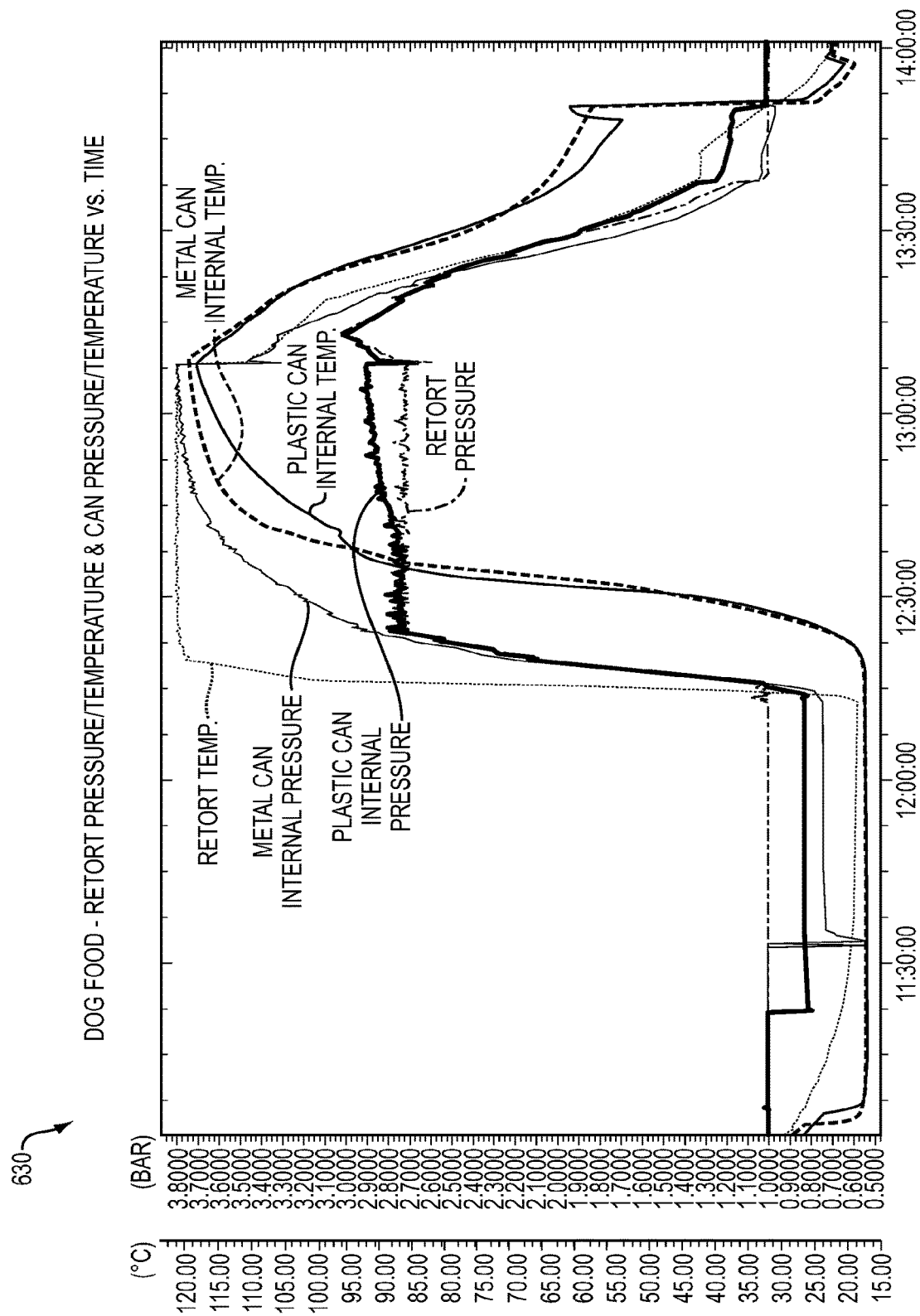
FIG. 27 is a graph of container internal temperature and container internal pressure versus time for a sealed example container with a plastic body and a metal lid and a sealed conventional all-metal container, both filled with dog food, during a retort process.
Figure 28:
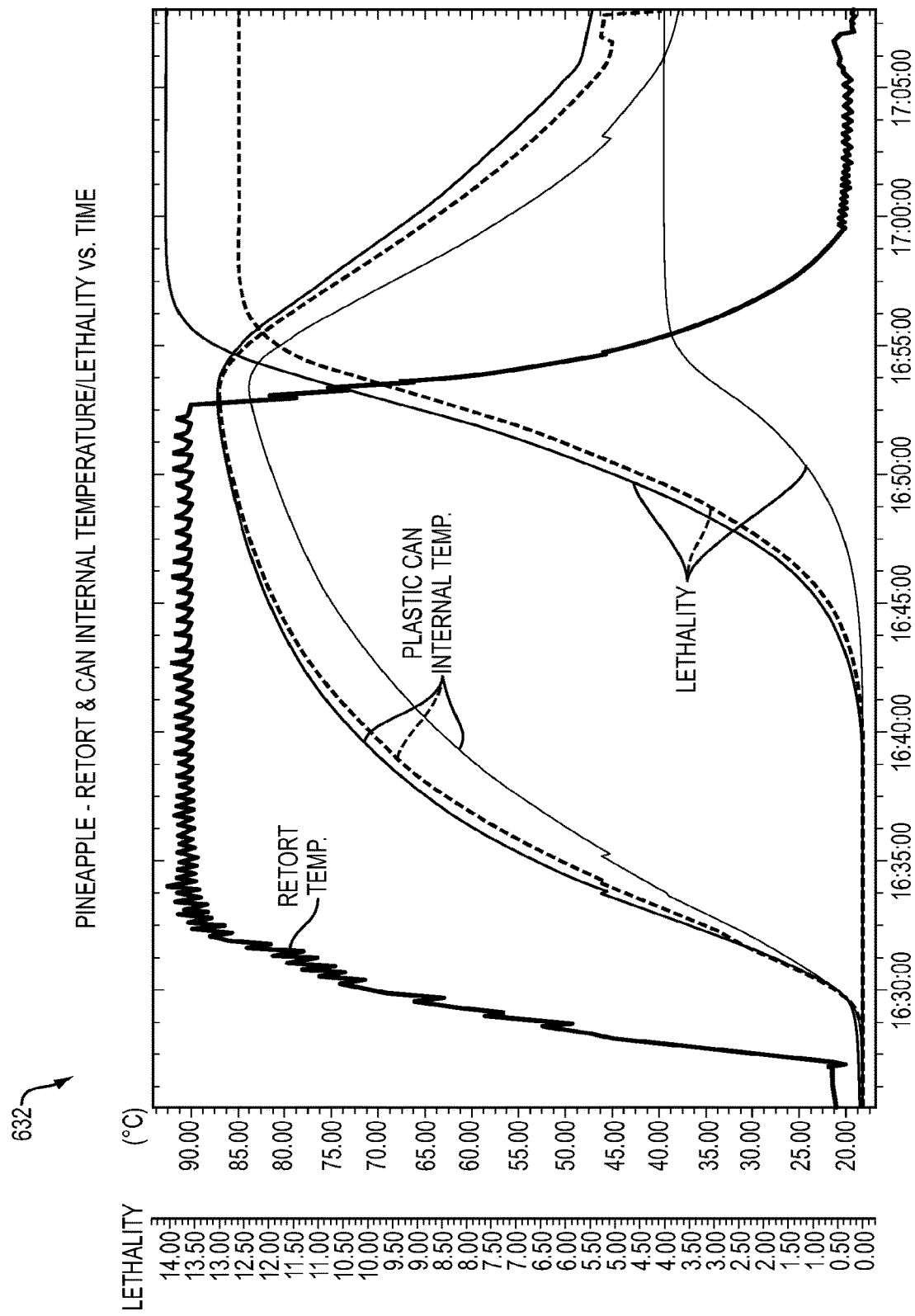
FIG. 28 is a graph of retort temperature, container internal temperature, and lethality versus time for sealed example containers filled with pineapple during a retort process.
Figure 29:
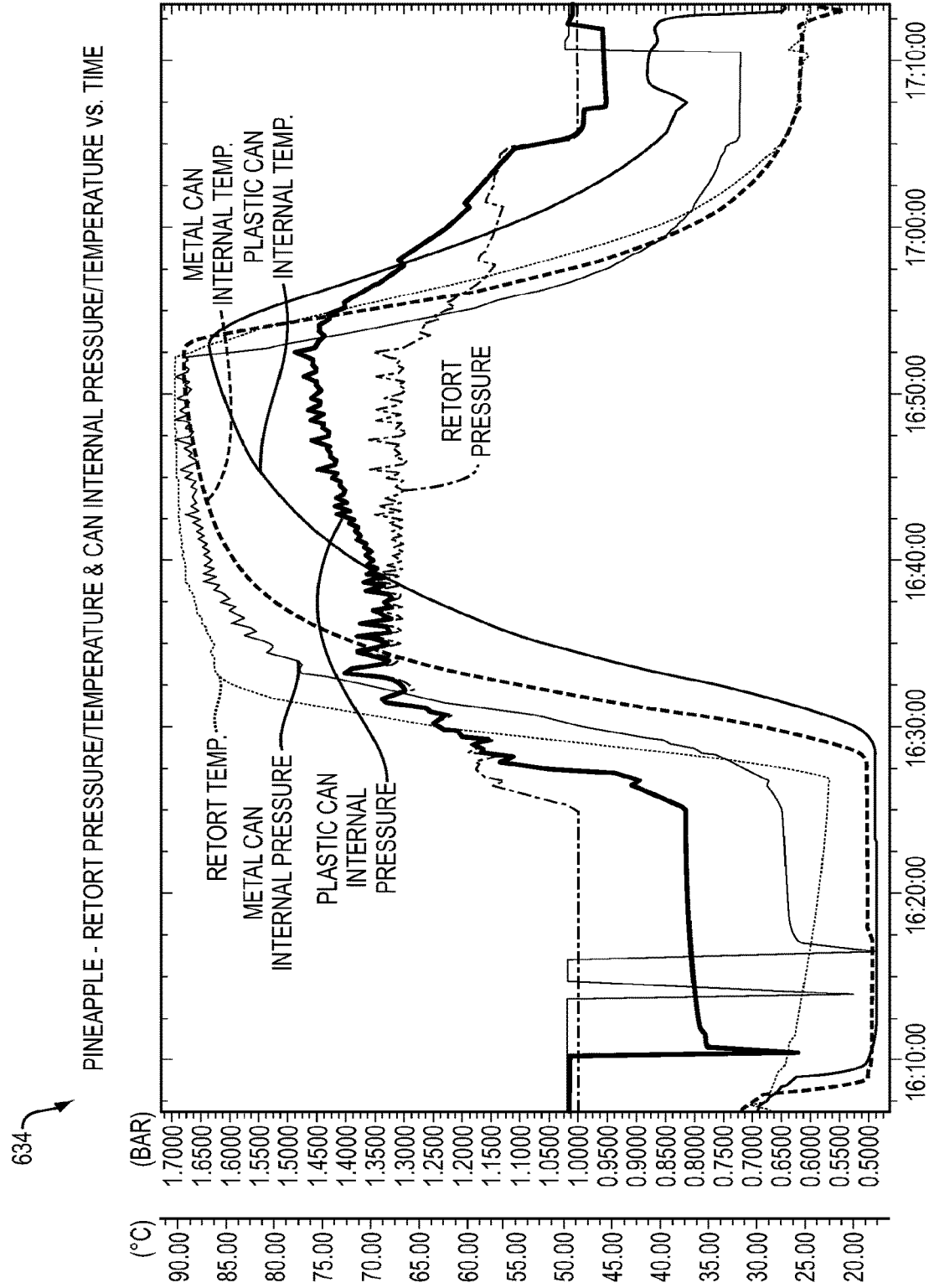
FIG. 29 is a graph of container internal temperature and container internal pressure versus time for a sealed example container with a plastic body and a metal lid and a sealed conventional all-metal container, both filled with pineapple, during a retort process.
Figure 30:
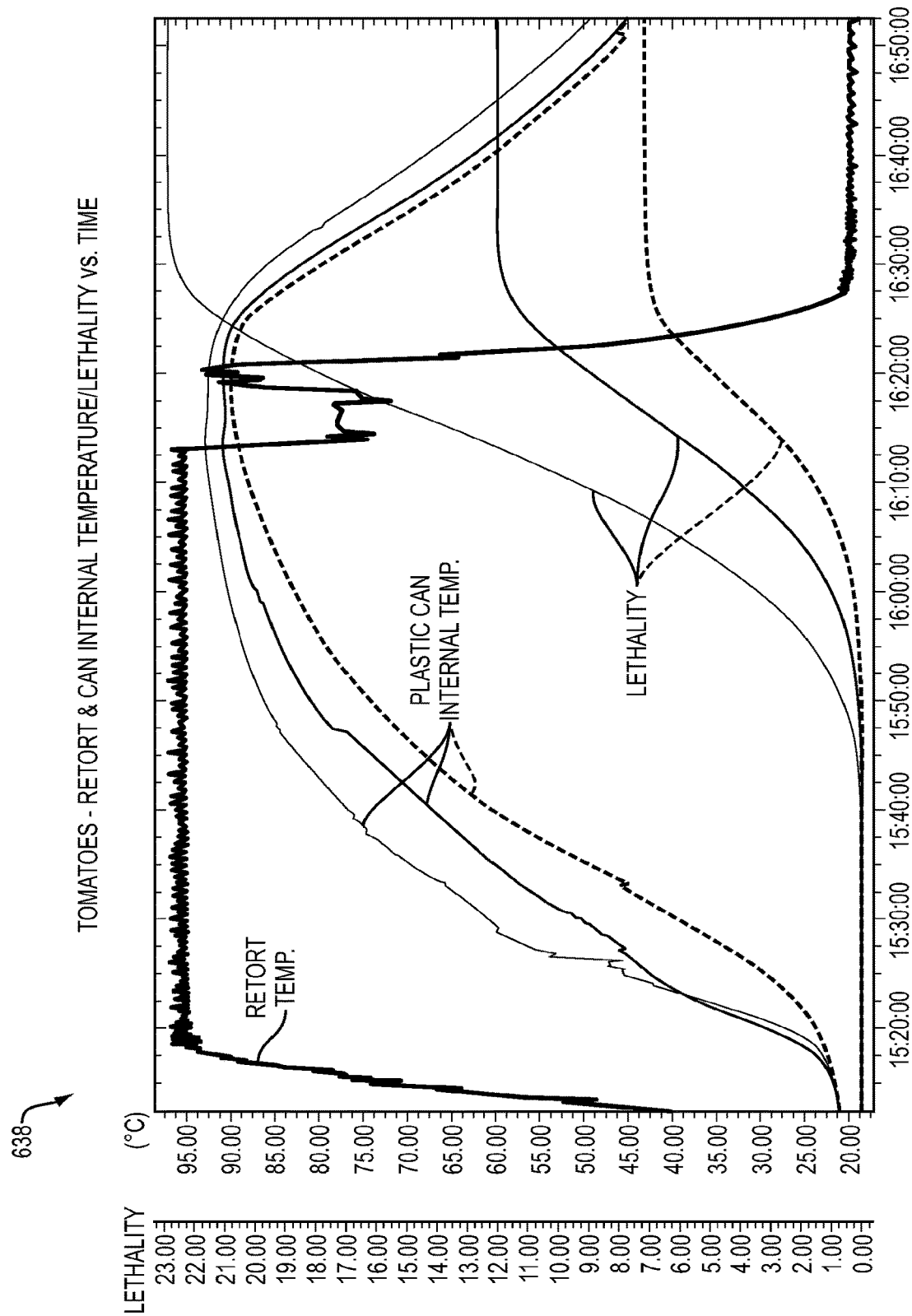
FIG. 30 is a graph of retort temperature, container internal temperature, and lethality versus time for sealed example containers filled with tomatoes during a retort process.
Figure 31:
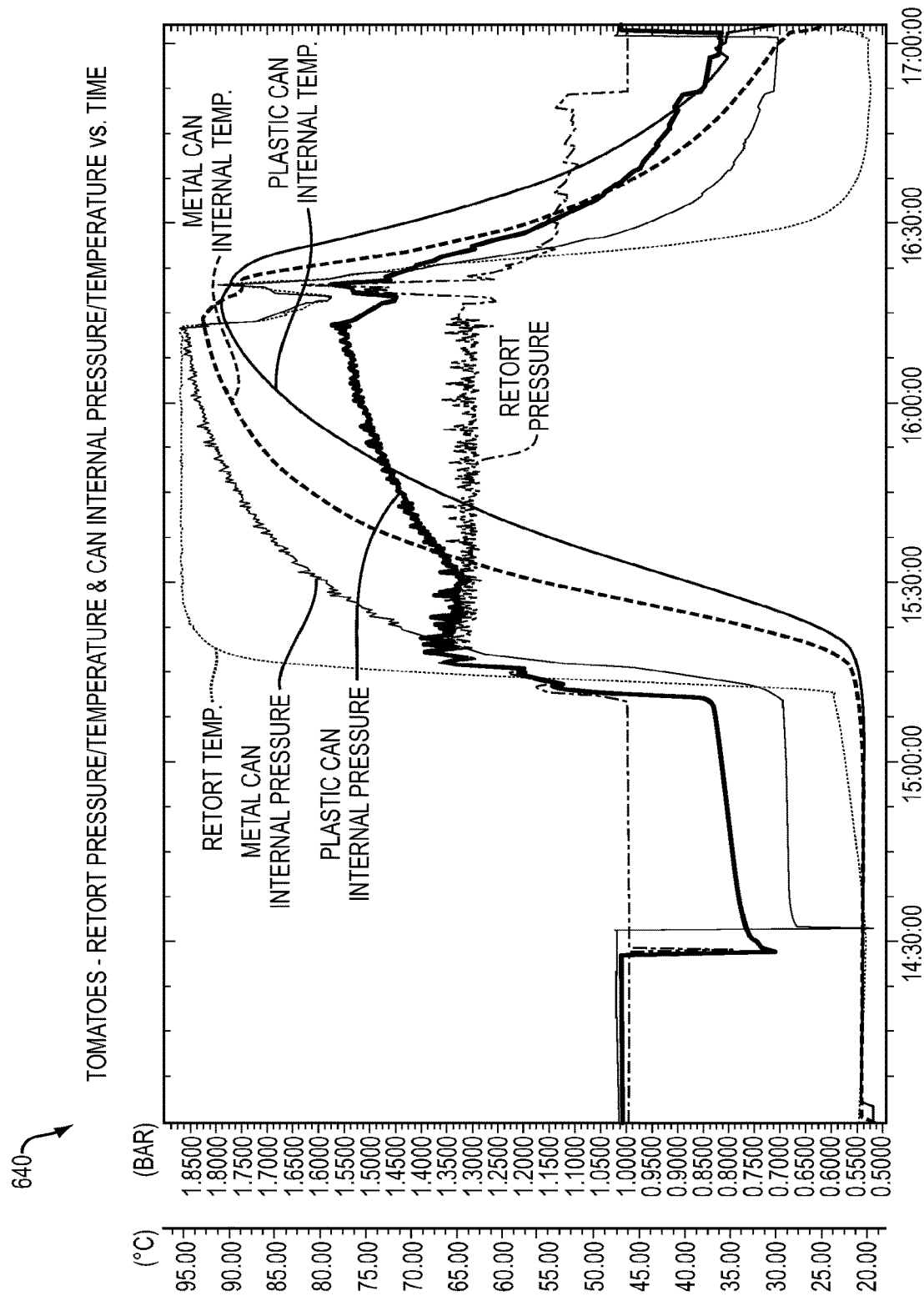
FIG. 31 is a graph of container internal temperature and container internal pressure versus time for a sealed example container with a plastic body and a metal lid and a sealed conventional all-metal container, both filled with tomatoes, during a retort process.

FIG. 27 is a graph 630 of retort pressure, can temperature and can pressure as a function of time during a retort process for a can filled with dog food. During some of the retort process, the plastic can internal pressure exceeds the retort pressure, which occurs for some specific combinations of target temperature for the contents, head space in the can, and pressure inside the head space that lead to an internal pressure in the can beyond which the flexible portion can fully accommodate, however it was still sufficient to prevent unwanted paneling or bulging in the container following the retort process.

Figure 32:
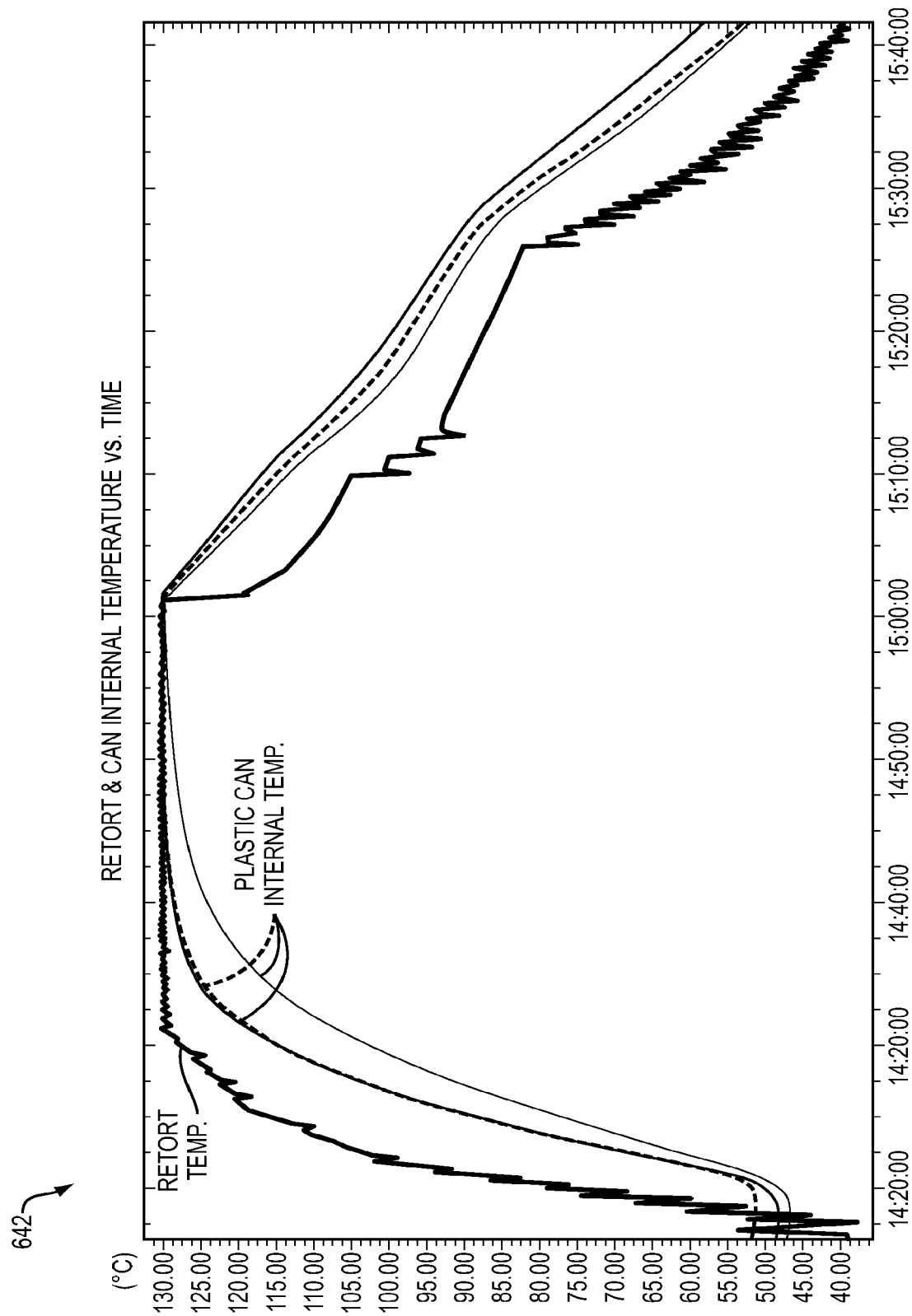
FIG. 32 is a graph of container internal temperature and container internal pressure versus time for several sealed example containers.

Graph 642 in FIG. 32 shows how the internal container temperature lags the retort chamber temperature for several different example plastic containers.

Figure 33:
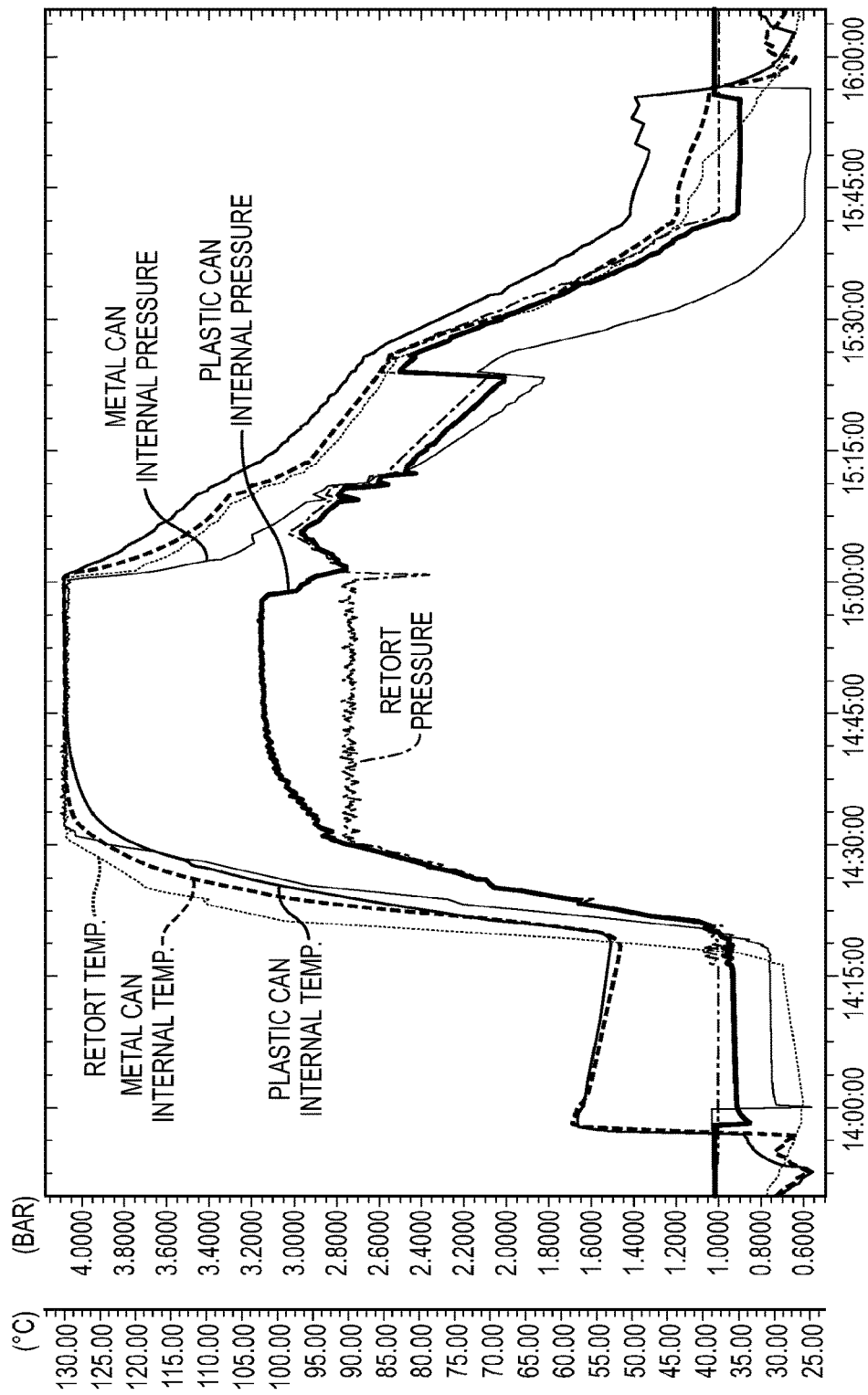
FIG. 33 is a graph of container internal temperature and container internal pressure versus time for a sealed example container with a plastic body and a metal lid and a sealed conventional all-metal container during a retort process conducted without overpressure.

FIG. 33 is a graph 644 showing pressure and temperature data taken for plastic cans 2010 and metal cans in an experiment in which no over-pressure was used. Although the plastic can 2010 did experience a positive differential pressure of about 0.4 bar (about 5.8 psi) at the retort temperature of 130° C.; this differential pressure was much smaller than the differential pressure of about 1.4 bar (about 20 psi) for the metal can at the same retort temperature. The plastic can 2010 exhibited only a small negative differential pressure for low temperatures.

Although the finite element analysis simulations predicted that the model container 510 would exhibit deflection corresponding to a 16 ml change in volume (a 3.8% volume change), during testing it was determined that the example containers 2010 actually exhibited a 24 ml change in volume (a 5.8% volume change) during retort processing without resulting in a readily visible bulging or paneling of the side portions of the containers following a retort process.

During testing, the plastic containers 2010 withstood a positive differential pressure of about 400 mb (5.8 psi) at 130° C. without bulging and a negative differential pressure of about −200 mb (−2.9 psi) at room temperature without paneling.

The example containers modeled and tested employed an outer sidewall diameter and height that are commonly used in current metal cans. Further, the filling processes used and the retort processes tested for the example containers are the types of retort processes commonly used in current metal cans. Thus, the inventors demonstrated through simulations and experiments that the example containers could be used to replace commonly used metal cans.

Figure 34:
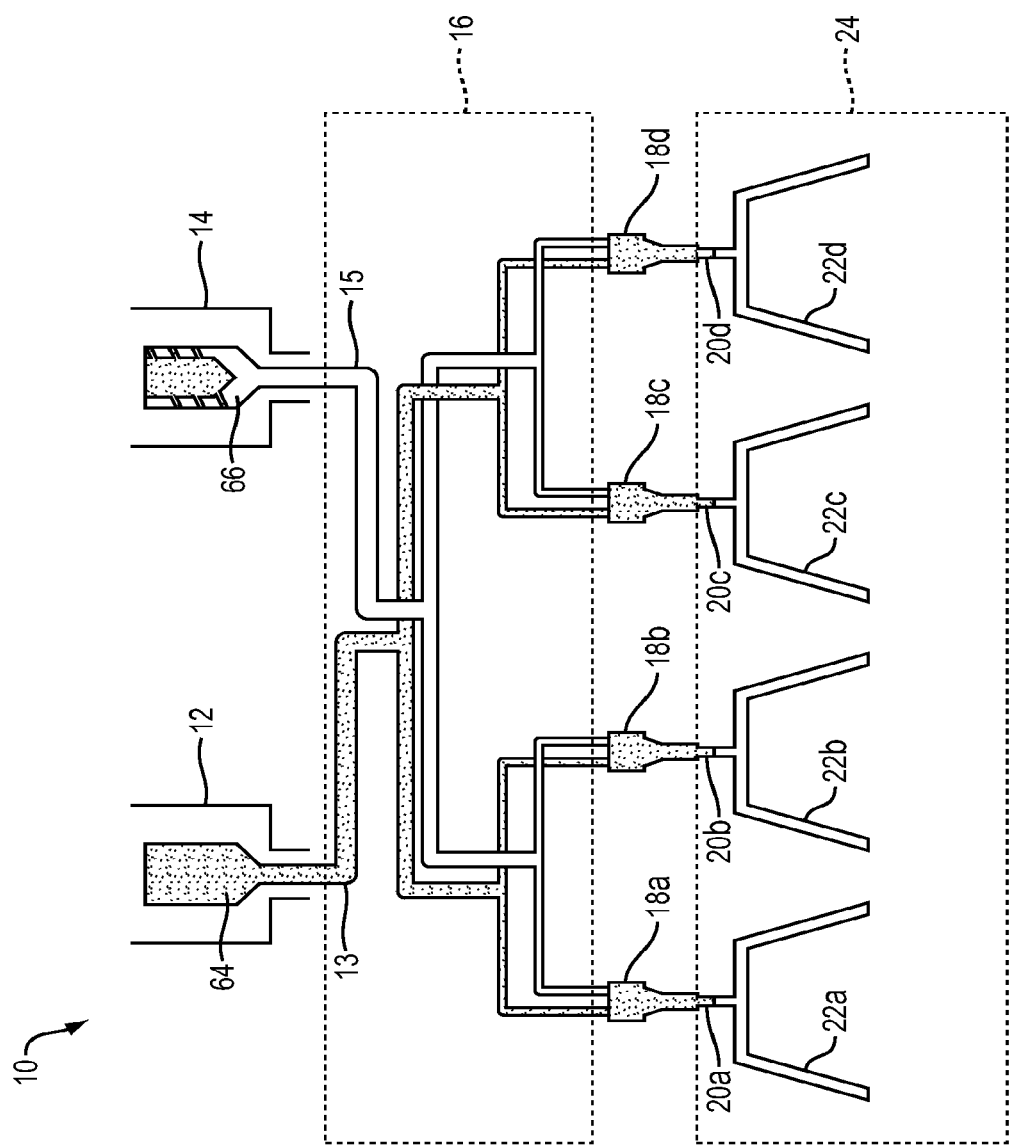
FIG. 34 is schematic cross-sectional view of a co-injection molding system.

FIG. 34 is a schematic view of a system 10 suitable for practicing exemplary embodiments disclosed herein. Co-injection molding system 10 is configured to co-inject at least two polymeric plastic material streams into a mold cavity to produce one or more articles, for example container 1510 discussed herein, each having multiple co-injected plastic layers. Co-injection molding system 10 includes a first material source 12, and a second material source 14. First material source 12 supplies a first polymeric material 64 for use in forming at least one layer of a resulting molded plastic article. Second material source 14 supplies a second polymeric material 66 for use in forming at least one layer of the resulting molded plastic article. System 10 co-injects multiple streams (e.g., an inner stream, an outer stream, and an interior or core stream) to form multiple layers of a resulting article. Materials suitable for use with plastic container embodiments disclosed herein include, but are not limited to, polymer-based materials such as, high density polyethylene (HDPE), polypropylene (PP), ethylene vinyl alcohol (EVOH), and MXD6 nylon. For example, in some embodiments, the inner and outer streams which form inner and outer layers are HDPE, while an interior stream used to form an interior layer is a material chosen to enhance the overall performance of the resulting article, or to reduce the cost of the resulting article. For example, one or more interior streams for interior layers may include one or more of a barrier material (MXD6 Nylon or EVOH), an oxygen scavenging material, a recycled material, or other performance-enhancing or cost-reducing material. The type of material used for the interior layer/stream is often different from the type of material used for the inner and outer layers/streams.

System 10 includes a manifold 16 configured for delivery of the first and second polymeric materials 64, 66. In some embodiments (not shown), the manifold may consist of separate manifolds for each polymeric material. Co-injection molding system 10 further includes nozzle assemblies 18A, 18B, 18C, 18D and a mold 24. Mold 24 defines gates 20A, 20B, 20C, 20D, and corresponding mold cavities 22A, 22B, 22C, 22D.

A first polymeric material, referred to herein as a first material, is injected by first material source 12 and a second polymeric material, referred to herein as a second material, is injected by second material source 14. System 10 includes a first flow channel 13 of manifold 16 configured to distribute the first material to one or more of nozzles 18A-18D, and a second flow channel 15 of manifold 16 configured to distribute the second material to one or more of nozzles 18a-18d. First material and second material combine into a co-polymeric stream, for example, in nozzles 18a-18d, which is injected into mold cavities 22a-22d for molding resulting articles. Each nozzle 18a-18d may include a flow initiation element (not shown in FIG. 34), which is used to prevent or permit of the flow of material into a corresponding mold cavity. In nozzles 18a-18d, the flow stream of the first material 64 and the flow stream of the second material 66 combine to form an annular combined polymeric stream in which the second material forms an interior or core stream in the combined polymeric stream while the first material forms the inner and outer streams in the combined stream. The inner and outer streams encase the interior or core stream as the annular combined polymeric stream is injected from the nozzle. Methods for co-injecting multiple polymeric materials to form plastic articles with multiple layers of different materials are generally known, such as described in U.S. Pat. No. 6,908,581 and the documents incorporated therein, each of which is also incorporated by reference herein in its entirety. Further details regarding how a combined polymeric plastic stream is produced within the injection nozzle are provided in the description of FIG. 35 below.

Although system 10 is depicted including four nozzle assemblies 18A-18D and a mold that defines four gates (20A-20D), and four cavities (22A-22D) for forming four plastic articles simultaneously, one of ordinary skill in the art will appreciate that other embodiments may include different numbers of nozzle assemblies, gates, and cavities for forming different numbers of plastic articles simultaneously. For example, embodiments may include more than or fewer than four sets of nozzle assemblies, gates, and cavities shown in FIG. 34. Example embodiments for large scale production systems may include more sets of nozzle assemblies, gates, and cavities (e.g., 64 or more sets).

In the example embodiments described herein, the first material 64 is described as a skin material and the second material 66 is described as a core material. The terms skin material and core material merely denote that in the resulting article, a layer of the first material overlays a layer of the second material on one or both sides. The skin material need not be the outermost layer of the resulting article and the core material need not be a central interior layer of the resulting article. In some embodiments, the layer of the second material is located between layers of the first material. In some embodiments, for example if the container is made by a thermoforming process, an inner "skin" layer of the article may be formed from a different material than an outer "skin" layer of the article.

Figure 35:
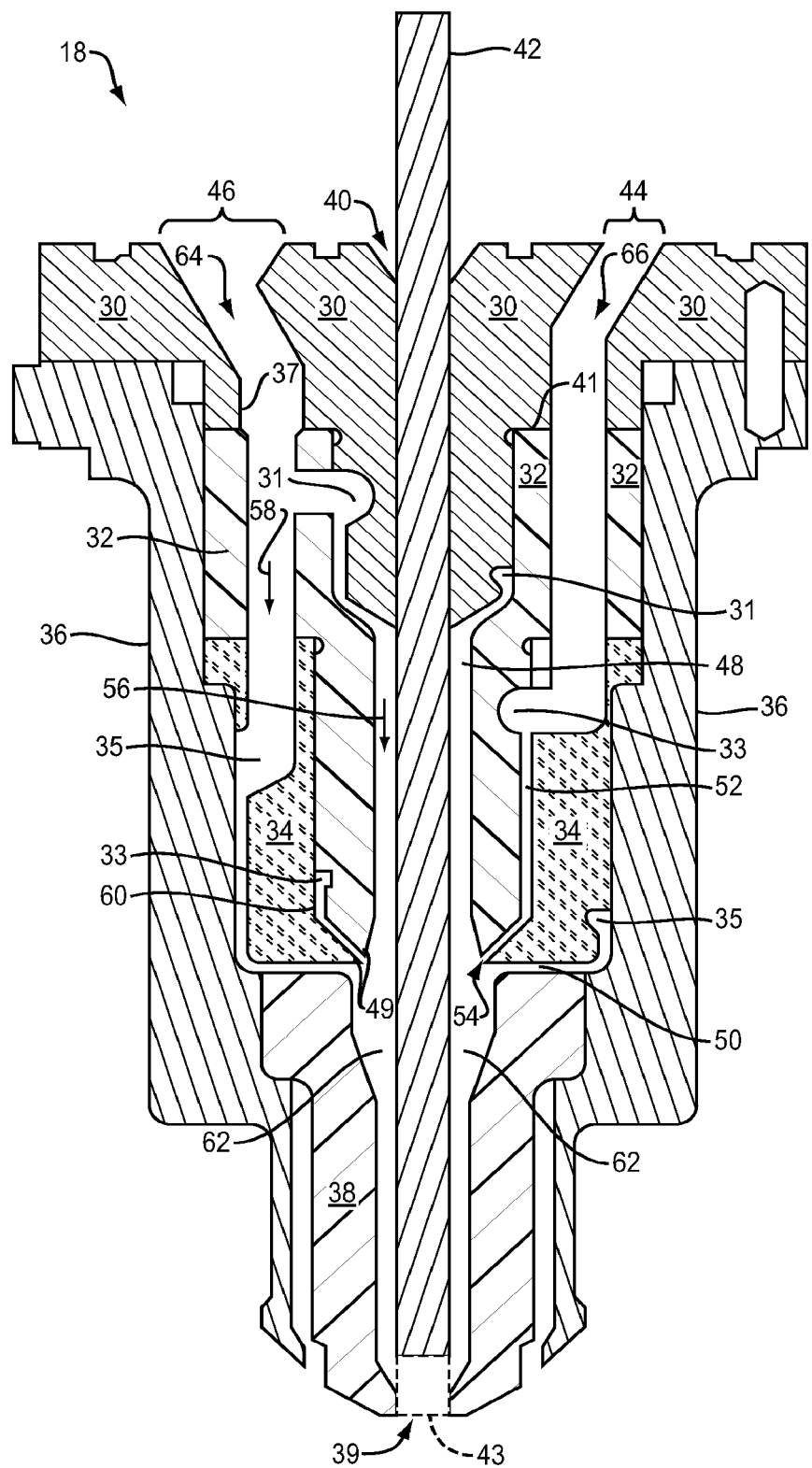
FIG. 35 is a cross-sectional view of an exemplary nozzle assembly suitable for practicing some embodiments taught herein.

FIG. 35 is a cross-sectional view of an exemplary nozzle assembly 18 suitable for practicing some embodiments taught herein. Nozzle assembly 18 includes an inner combining means 30, a middle combining means 32, and an outer combining means 34. Nozzle assembly 18 further includes nozzle body 36 and nozzle tip 38. Inner combining means 30, middle combining means 32, outer combining means 34, nozzle body 36, and nozzle tip 38 cooperatively combine to form conical, annular, and axial passages and channels in nozzle assembly 18. The nozzle assembly 18 is suitable for use in a co-injecting system, for example system 10 described with regard to FIG. 34, for forming a plastic container having two or more layers in accordance with embodiments hereof.

Inner combining means 30 includes a first inlet 46 to receive a first polymeric material 64, such as a skin material (i.e., inner and outer layer material), and a second inlet 44 to receive a second polymeric material 66, such as a core material (i.e., interior layer material). The inner combining means 30 further includes a through bore 40 configured to receive a valve pin 42. The through bore 40 extends through combining means 32, and through a portion of the outer combining means 34 to allow the valve pin 42 to move in an axial direction along a longitudinal axis $A_L$ of the nozzle assembly 18. Through bore 40 has an inner wall diameter that varies along the longitudinal axis $A_L$ of the nozzle assembly 18. Valve pin 42 is movable in an axial direction along the central longitudinal axis of nozzle assembly 18 between a closed position, and at least one open position to assist in controlling the flow of the first polymeric material 64 and second polymeric material 66 through nozzle assembly 18 and into mold 24.

Middle combining means 32 cooperatively engages with the inner combining means 30 to form a portion of the plurality of annular flow channels in nozzle assembly 18. Middle combining means 32 receives from channel 37 the first polymeric material 64, and receives from channel 41 the second polymeric material 66 to manipulate the flow of each of the polymeric materials through a plurality of annular fluid carrying passages or channels. The flow manipulation carried out by middle combining means 32 initiates the creation of an outer material stream 58 and an inner material stream 56 that together encapsulate an interior or core material stream 60.

The middle combining means 32 when coupled with the inner combining means 30 forms a wrapped-coat-hanger die passageway 31 that circumferentially extends around the through bore 40 and valve pin 42. Wrapped-coat-hanger die passageway 31 provides annular fluid flow passage 48 with a uniform melt distribution of the first polymeric material 64. Annular fluid flow passage 48 directs an annular flow stream of the inner material stream 56 into stream combination area 54 through an orifice.

Outer combining means 34 cooperatively engages with middle combining means 32 to form one or more fluid carrying passages or channels to manipulate the second polymeric material 66 forming an interior or core layer of the resulting plastic object. The outer combining means 34 when coupled with the middle combining means 32 forms a wrapped-coat-hanger die passageway 33 that circumferentially extends around inner material stream 56, through bore 40, and valve pin 42. Wrapped-coat-hanger die passageway 33 provides conical fluid flow passage 52 with a uniform melt distribution of the second polymeric material 66. Conical flow passage 52 feeds an annular stream of the second polymeric material 66 into stream combination area 54 through another orifice.

The outer combining means 34 cooperatively engages with nozzle body 36. The outer combining means 34, when coupled with the nozzle body 36, forms wrapped-coat-hanger die passageway 35 that circumferentially extends around the interior layer stream 52, the inner layer stream 56, the through bore 40, and the valve pin 42. Wrapped-coat-hanger die passageway 35 provides radial fluid flow passage 50 with a uniform melt distribution of the first polymeric material 64. Radial fluid flow passage 50 feeds stream combination area 54 with a flow of first polymeric material 64 through an orifice. The first polymeric material 64 fed into the stream combination area 54 through the orifice forms the outer layer of a resulting molded object.

Fluid flow passages 48, 50, and 52 feed stream combination area 54 with the outer material stream 58, the inner material stream 56, and the interior material stream 60. A portion of the nozzle tip 38, a portion of the outer combining means 34, a portion of the middle combining means 32, and a portion of the valve pin 42, in combination form the stream combination area 54. Stream combination area 54 combines in a simultaneous or near simultaneous manner the outer material stream 58 received from the fluid flow passage 50, the inner material stream 56 received from the fluid flow passage 48, and the interior material stream 60 received from the fluid flow passage 52 to form annular output stream.

The channels, bores and passageways of the inner combining means 30, the middle combining means 32 and the outer combining means 34 and more specifically the channels, bores and passageways associated with the formation and the flow of inner and outer layer material in the nozzle assembly 18 may be sized, defined, adapted and configured to control or produce a desired volumetric flow ratio. In this manner, the valve pin 42 may remain in a fixed position and does not need to be moved to control or form a particular volumetric flow ratio. In other words, the nozzle assembly 18 has a channel configuration and structure to output a desired or selected volumetric flow ratio without the need of an associated controller or microprocessor. In some exemplary embodiments, the valve pin 42 may be controlled by a controller or microprocessor to control the volumetric flow ratio.

The annular output stream 49 flows from the stream combination area 54 through fluid flow passage 62 to output portion 39 of nozzle assembly 18. Fluid flow passage 62 has an annular inner passage that radially extends about through bore 40 and axially extends from the stream combination area 54 to the output portion 39. The output portion 39 communicates with a gate of a mold, such as one of gates 20A-20D. With the valve pin 42 in a withdrawn position as depicted, a flow path is established between the output portion 39 and the gate of the mold cavity. Having the valve pin 42 in an advanced position as depicted by dotted line 43, the flow path from the output portion to the gate of the mold cavity is blocked.

The annular output stream 49 formed by the stream combination area 54 has an outer annular skin layer and an inner annular skin layer formed of the first polymeric material 64, and an interior or core annular layer formed of the second polymeric material 66. The inner and outer skin layers of the first polymeric material 64 may each have a substantially like cross sectional area as the materials flow through the fluid flow passage 62 to the output portion 39. A range of ratios of inner to outer volumetric flow rate are between 80:20 and 20:80. The exact ratio is chosen to locate the interior layer at the desire position within the wall of the molded article. The inner and outer skin layers of the first polymeric material 64 encapsulate the interior layer of the second polymeric material 66, which forms a core portion of a resulting plastic object. Upon injection from the nozzle assembly 18, the combined polymeric stream 49, includes an interior stream that flows along concentric or annular streamlines between the inner and outer polymeric streams.

FIG. 36 illustrates an exemplary computing environment suitable for practicing exemplary embodiments taught herein. The environment may include a co-injection control device 400 coupled, wired, wirelessly or a hybrid of wired and wirelessly, a to co-injection system, for example, system 10 of FIG. 34. The co-injection control device 400 is programmable to implement executable Flow Control Code 450 for forming a plastic container having an interior or core layer configured as, for example, a barrier layer and/or scavenger layer. Co-injection control device 400 includes one or more computer-readable media for storing one or more computer-executable instructions or software for implementing exemplary embodiments. The computer-readable media may include, but are not limited to, one or more types of hardware memory, non-transitory tangible media, etc. For example, memory 406 included in the co-injection control device 400 may store computer-executable instructions or software, e.g., instructions for implementing and processing every module of the executable Flow Control Code 450. Co-injection control device 400 also includes processor 402 and, one or more processor(s) 402' for executing software stored in the memory 406, and other programs for controlling system hardware. Processor 402 and processor(s) 402' each can be a single core processor or multiple core (404 and 404') processor.

Virtualization may be employed in co-injection control device 400 so that infrastructure and resources in the computing device can be shared dynamically. Virtualized processors may also be used with the executable Flow Control Code 450 and other software in storage 416. A virtual machine 414 may be provided to handle a process running on multiple processors so that the process appears to be using only one computing resource rather than multiple. Multiple virtual machines can also be used with one processor.

Memory 406 may comprise a computer system memory or random access memory, such as DRAM, SRAM, EDO RAM, etc. Memory 406 may comprise other types of memory as well, or combinations thereof.

A user may interact with co-injection control device 400 through a visual display device 422, such as a computer monitor, which may display the user interfaces 424 or any other interface. The visual display device 422 may also display other aspects or elements of exemplary embodiments, e.g., materials databases, production information, etc. Co-injection control device 400 may include other I/O devices such a keyboard or a multi-point touch interface 408 and a pointing device 410, for example a mouse, for receiving input from a user. The keyboard 908 and the pointing device 410 may be connected to the visual display device 422. Co-injection control device 400 may include other suitable conventional I/O peripherals. Co-injection control device 400 may further comprise a storage device 416, such as a hard-drive, CD-ROM, or other non-transitory computer readable media, for storing an operating system 418 and other related software, and for storing executable Bather Coverage Code 450.

Co-injection control device 900 may include a network interface 412 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, controller area network (CAN), or some combination of any or all of the above. The network interface 412 may comprise a built-in network adapter, network interface card, PCMCIA network card, card bus network adapter, wireless network adapter, USB network adapter, modem or any other device suitable for interfacing authorization computing device 900 to any type of network capable of communication and performing the operations described herein. Moreover, co-injection control device 400 may be any computer system such as a workstation, desktop computer, server, laptop, handheld computer or other form of computing or telecommunications device that is capable of communication and that has sufficient processor power and memory capacity to perform the operations described herein.

Co-injection control device 400 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. The operating system may be running in native mode or emulated mode.

Flow Control Code 450 includes executable code executable by the processor 402 to control the co-injection system 10 to selectively control a volumetric flow volume of the inner and outer polymeric streams, control a position of the interior core material stream relative to a velocity flow front of the combined polymeric stream and control extrusion start time of the interior core stream relative to the extrusion start time of the inner and outer polymeric streams as taught herein. Co-injection systems taught herein facilitate the co-injection molding of container such as food or beverage containers.

As may be recognized by those of ordinary skill in the pertinent art based on the teachings herein, numerous changes and modifications may be made to the above-described and other embodiments of the present disclosure without departing from the spirit of the invention as defined in the appended claims. Accordingly, this detailed description of embodiments is to be taken in an illustrative, as opposed to a limiting, sense. Those skilled in the art will recognize, or be able to ascertain using no more than routine experimentation, many equivalents to the specific embodiments of the described herein. Such equivalents are intended to be encompassed by the following claims.

What is claimed is:

1. A retortable plastic container configured to be sealed, the retortable plastic container comprising:
    a side wall defining an open end of the container; and
    a base opposite the open end, the base having
        a flexible portion defining a bottom panel of the container including a central region having a convex shape extending away from the open end of the container, and
        a skirt portion extending away from the open end of the container,
    wherein when the container is sealed at least a part of the central region of the flexible portion is configured
        to deflect in a first direction in response to a positive pressure difference between an interior pressure and an exterior pressure of the sealed container, and
        to deflect in a second direction, which opposes the first direction, in response to a negative pressure difference between the interior pressure and the exterior pressure of the sealed container.

2. The retortable plastic container of claim 1, wherein the flexible portion of the base also includes a peripheral region connecting the central region and the side wall, the peripheral region having a concave shape.

3. The retortable plastic container of claim 2, wherein a thickness of the flexible portion is constant across the central region and the peripheral region.

4. The retortable plastic container of claim 2, wherein the convex shape of the central region and the concave shape of the peripheral region is an initial state of the container as formed.

5. The retortable plastic container of claim 1, wherein the side wall has a first diameter and the skirt portion has a second diameter smaller than the first diameter.

6. The retortable plastic container of claim 1, wherein the convex shape of the central region is a dome shape.

7. The retortable plastic container of claim 1, wherein an area of the central region is in a range of 38% to 47% of an area of the flexible portion.

8. The retortable plastic container of claim 1, wherein the side wall has a first thickness and the flexible portion of the base has a second thickness smaller than the first thickness.

9. The retortable plastic container of claim 1, wherein the part of the central region of the flexible portion is configured to deflect and change a volume of the container, when sealed, by about 3% to 9% without geometric deformation of the side wall of the container.

10. The retortable plastic container of claim 1, wherein the side wall and the flexible portion comprise
an inner layer comprising a first polymeric plastic material,
an outer layer comprising the first polymeric plastic material, and
an interior core layer comprising a second polymeric plastic material disposed between the inner layer and the outer layer.

11. The retortable plastic container of claim 1, wherein a deflection in the first direction of the part of the central region of the flexible portion reduces the positive pressure difference and a deflection in the second direction of the part of the central region of the flexible portion reduces the negative pressure difference.

12. A retortable plastic container configured to be sealed, the plastic container comprising:
a side wall defining an open end of the container; and
a base opposite the open end, the base having
a flexible portion defining a bottom panel of the container and including a central region having a convex shape extending away from the open end of the container, and
a skirt portion extending away from the open end of the container,
wherein when the container is sealed at least a part of the central region of the flexible portion is configured
to deflect in a first direction in response to a positive pressure difference between an interior pressure and an exterior pressure of the sealed container, and
to deflect in a second direction, that opposes the first direction, in response to a negative pressure difference between the interior pressure and the exterior pressure of the sealed container, and
wherein the flexible portion of the base and the side wall define a sealable portion of the container formed by an inner layer and an outer layer of a first moldable material and an interior core layer of a second moldable material encased within the inner layer and the outer layer.

13. The retortable plastic container of claim 12, wherein the skirt portion is formed by the first moldable material and substantially free of the second moldable material.

14. The retortable plastic container of claim 13, wherein the skirt portion is entirely free of the second moldable material.

15. The retortable plastic container of claim 12, wherein the first moldable material is one of polyethylene and polypropylene.

16. The retortable plastic container of claim 12, wherein the interior core layer is one of a barrier layer and a scavenging layer.

17. The retortable plastic container of claim 12, wherein a deflection in the first direction of the part of the central region of the flexible portion reduces the positive pressure difference and a deflection in the second direction of the part of the central region of the flexible portion reduces the negative pressure difference.

18. The retortable plastic container of claim 12, wherein the flexible portion further comprises
a concave shaped peripheral region extending between the central region and the side wall, wherein a thickness of the flexible portion is constant across the central region and the concave shaped peripheral region.

19. The retortable plastic container of claim 12, wherein the interior core layer extends within a range of 95%-99% of the sealable portion of the container.

20. A retortable plastic container configured to be sealed, the retortable plastic container comprising:
a side wall defining an open end of the container; and
a base opposite the open end, the base having
a flexible portion defining a bottom panel of the container including a central region having an as formed convex shape extending away from the open end of the container and a peripheral region having an as formed concave shape connecting the central region and the side wall, and
a skirt portion extending away from the open end of the container,
wherein when the container is sealed at least a part of the central region of the flexible portion is configured
to deflect in a first direction in response to a positive pressure difference between an interior pressure and an exterior pressure of the sealed container, and
to deflect in a second direction, which opposes the first direction, in response to a negative pressure difference between the interior pressure and the exterior pressure of the sealed container, and
wherein the flexible portion and the side wall are clear or translucent.

* * * * *